(12) United States Patent  
Takenaka et al.

(10) Patent No.: US 7,600,591 B2  
(45) Date of Patent: Oct. 13, 2009

(54) LEG TYPE MOBILE ROBOT

(75) Inventors: Toru Takenaka, Saitama (JP); Keizo Matsumoto, Saitama (JP); Hiroshi Gomi, Saitama (JP); Kazushi Hamaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 10/544,305

(22) PCT Filed: Apr. 28, 2005

(86) PCT No.: PCT/JP2005/008130

§ 371 (c)(1),  
(2), (4) Date: Aug. 1, 2005

(87) PCT Pub. No.: WO2006/025135

PCT Pub. Date: Mar. 9, 2006

(65) Prior Publication Data

US 2006/0249314 A1    Nov. 9, 2006

(30) Foreign Application Priority Data

Aug. 30, 2004 (JP) ............................. 2004-250418

(51) Int. Cl.  
*B25J 5/00* (2006.01)

(52) U.S. Cl. ........................................ 180/8.6
(58) Field of Classification Search .................. 180/8.1, 180/8.5, 8.6  
See application file for complete search history.

(56) References Cited

U.S. PATENT DOCUMENTS

| 5,421,426 A | * | 6/1995 | De Beaucourt et al. ...... 180/8.1 |
| 5,455,497 A | * | 10/1995 | Hirose et al. ........... 318/568.12 |
| 7,228,923 B2 | * | 6/2007 | Takenaka et al. ............. 180/8.6 |

FOREIGN PATENT DOCUMENTS

| JP | 58-131441 | 8/1983 |
| JP | 5-293776 | 11/1993 |
| JP | 2003-071776 | 3/2003 |
| JP | 2003071776 A | * 3/2003 |

* cited by examiner

*Primary Examiner*—Kevin Hurley  
(74) *Attorney, Agent, or Firm*—Squire, Sanders & Dempsey L.L.P.

(57) ABSTRACT

A leg type mobile robot (R) including an body (R2), legs (R1) each connected to the body (R2) via a first joint (12, 13), and foots (R17) each connected to an end part of the leg part (R1) via a second joint (15, 16), the foot (17) including a foot portion (61) having a lower end part having a ground area (64, 66) grounded on a floor surface, the foot portion (61) including a plate spring part (62) supporting empty weight while bending at the time of being grounded.

24 Claims, 14 Drawing Sheets

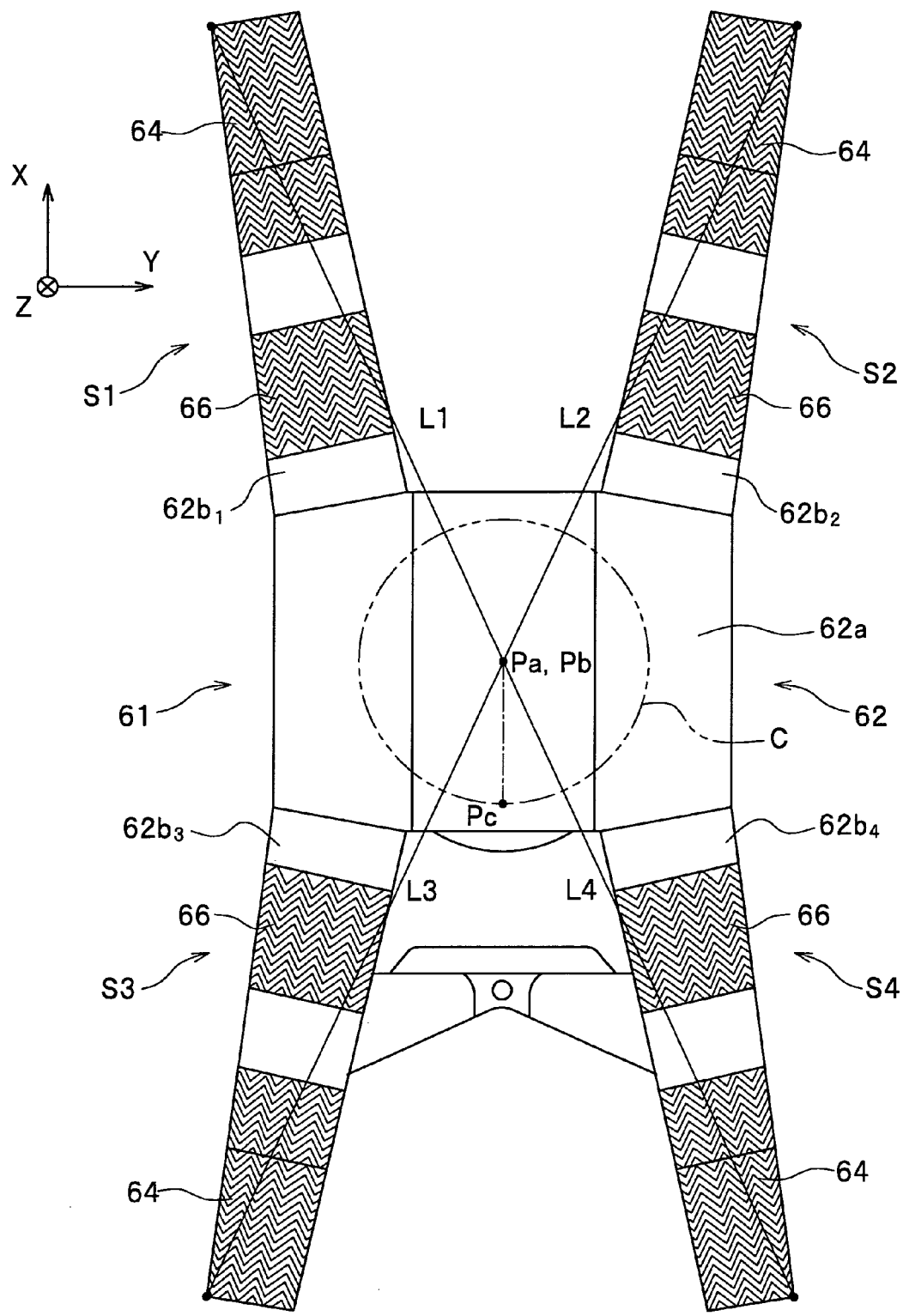

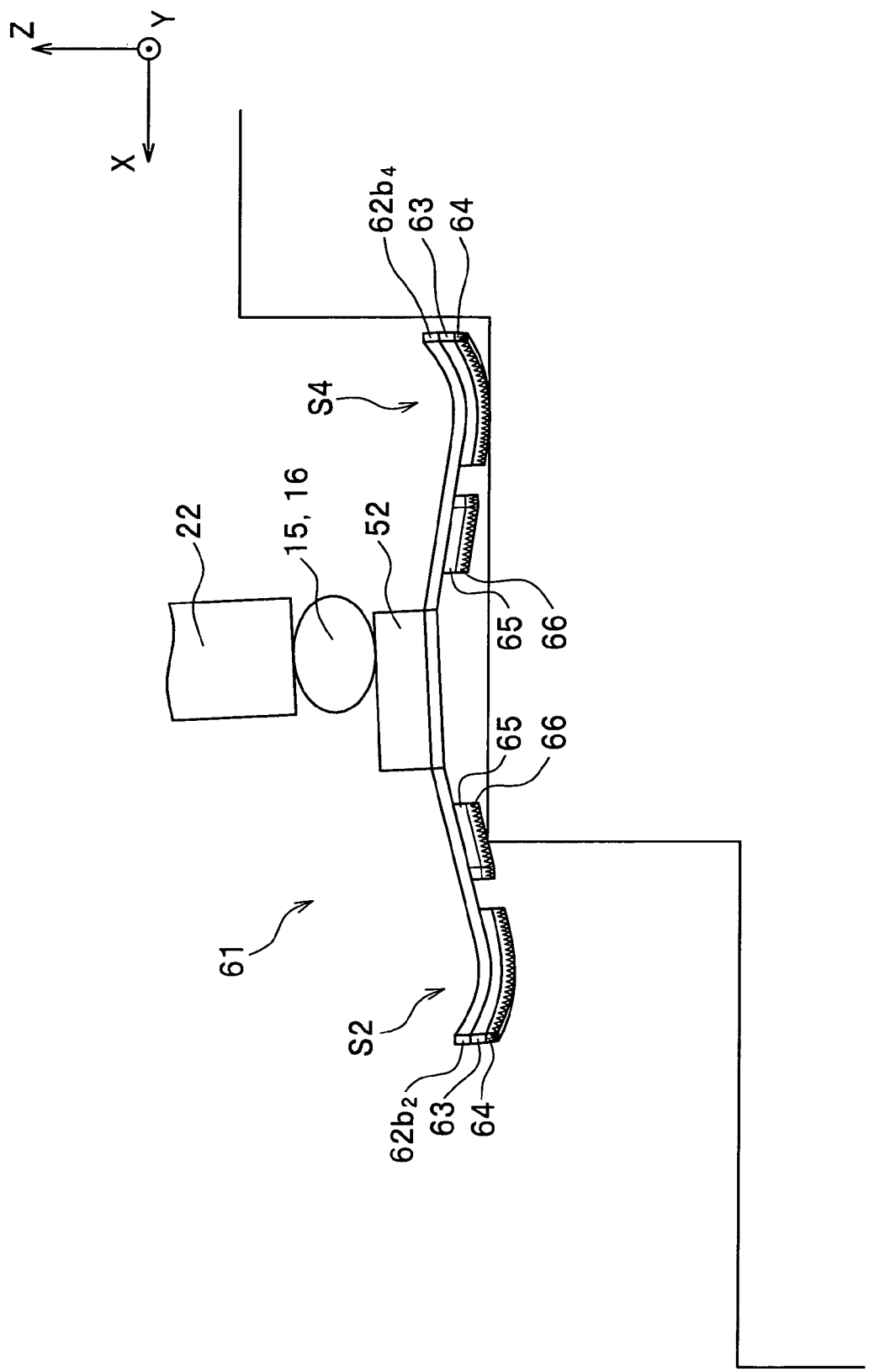

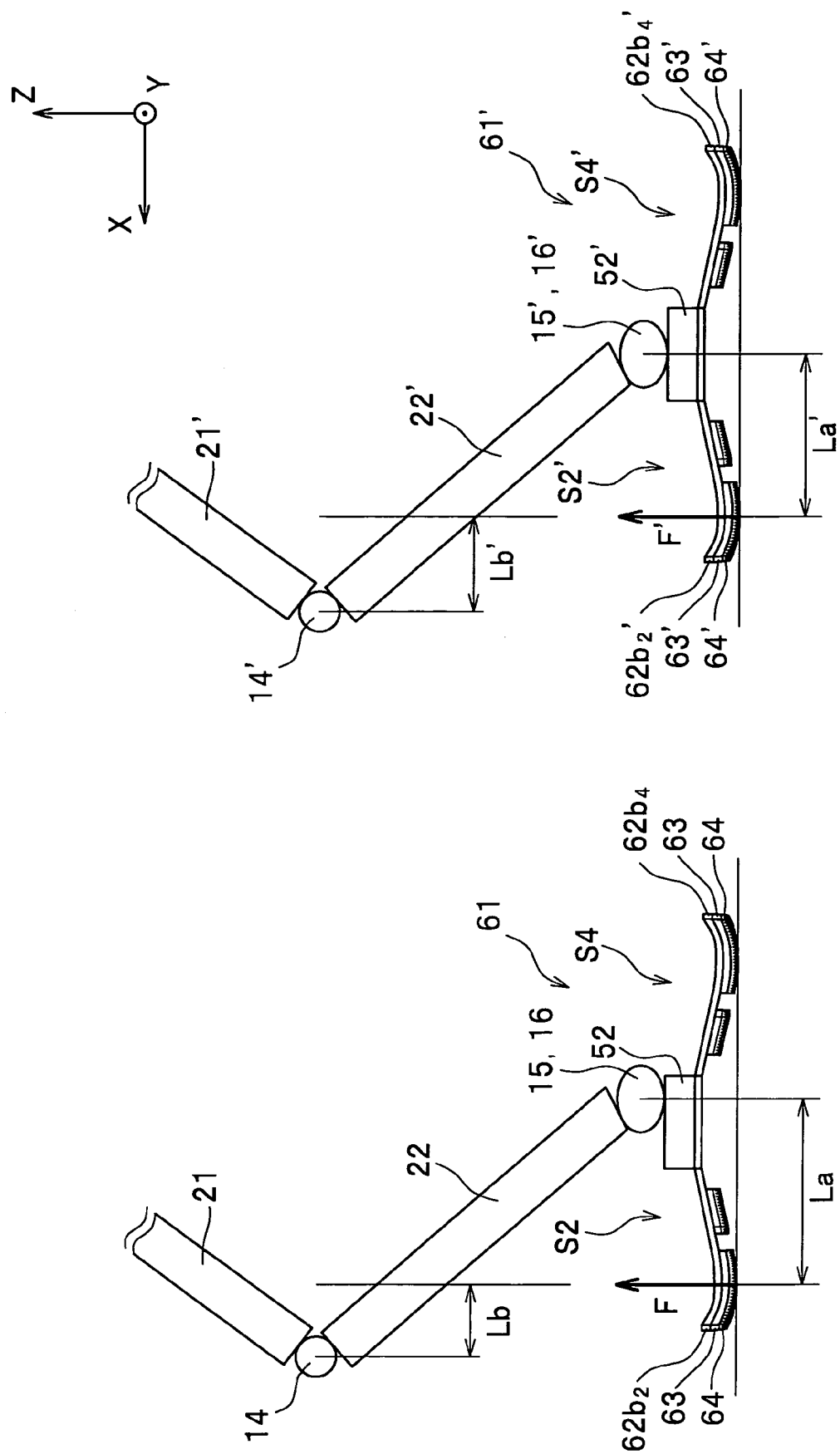

LEG TYPE MOBILE ROBOT

FIELD OF THE INVENTION

The present invention relates to a leg type mobile robot.

BACKGROUND ART

For example, a technique described in Japanese examined patent publication No.2003-71776 has been known as a technique for a leg type mobile robot, particularly the structure of a foot of the leg type mobile robot. A foot of the leg type walking robot described in Patent Reference 1 is composed by a force sensor (floor reaction force detector) for detecting floor reaction force, a spring mechanism provided with a elastic member having an impact absorbing function, a foot sole frame, a foot sole plate and a sole sequentially from above.

The force sensor is connected to the foot sole frame via the spring mechanism, and shock added to the force sensor at the time of landing, particularly the shock acted in an oblique direction can be reduced by the deformation of the elastic member.

However, the leg type walking robot described in Japanese examined patent publication No. 2003-71776 requires a lager number of components and a complicated structure.

There is a desire to enhance the speed (walk and run) of the movement of the above leg type walking robot. When the leg type walking robot moves at a high speed, large inertia force is generated on the leg part. So as to reduce the inertia force, there is a desire to reduce the weight of the end side of the leg part, that is, the weight of a foot.

Since impulse force due to the floor reaction force added to the foot at the time of being grounded also becomes larger when the leg type walking robot moves at high speed, it is preferable that the foot of the leg type walking robot has a structure capable of enduring the impulse force.

Therefore, there have been required to provide a leg type mobile robot which can absorb the shock at the time of landing in spite of a simple structure and has the foot reduced in weight.

DESCRIPTION OF THE INVENTION

The present invention relates to a leg type mobile robot which includes an body, legs each connected to the body via a first joint, and foots each connected to an end part of the leg part via a second joint.

In this mobile robot, the respective foot including a foot portion having a lower end part having a ground area grounded on a floor surface, and the respective foot portion including a plate spring part supporting empty weight while bending at the time of being grounded.

In the present invention, the term "ground area" means an area where the leg type mobile robot is grounded on the floor surface when the leg type mobile robot moves.

In the present invention, the term "empty weight" is the empty weight of the leg type mobile robot. The term "support empty weight while bending" means that one or more plate spring parts elastically deform and the empty weight of the robot is supported by the elastic force of one or more plate spring parts.

In the present invention, the term "foot portion" means the lower substructure of the foot of the leg type mobile robot, and a part receiving reaction force from the floor surface. In the present invention, the foot portion is provided with one or more plate spring parts, and thereby the empty weight is supported by the bending of one or more plate spring parts at the time of being grounded.

Here, it is preferable that the foot portion of the leg type mobile robot includes the plurality of ground areas.

In the present invention, the term "a plurality of ground areas" is ground areas divided into a plurality. For example, the plurality of ground areas are obtained by providing a plurality of plate spring parts and forming a ground area on each plate spring part. It is also possible to form the plurality of ground areas on one plate spring part. Thus, the plurality of ground areas are provided, and thereby the foot portion can support the leg type mobile robot with sufficient balance even in the state where the leg type mobile robot is stopped.

Here, it is preferable that the plurality of ground areas are separately arranged backward and forward to the second joint.

For example, the operation of the two-feet mobile robot imitating a human is performed so that the two-feet mobile robot lands from the back side (heel part) of the foot portion, and kicks at the front side (tiptoe part) so as to imitate the walk of a human. Since the ground areas of the leg type mobile robot of claim 3 are arranged at the front and back sides, the control is suitably performed. When the leg type mobile robot moves forward, the load center of the leg type mobile robot moves in the forward-and-backward direction of the leg type mobile robot, and a control for moving the load center to an ideal position is performed. Therefore, the leg type mobile robot of claim 3 plants its feet using the front and back ground areas, and the control for moving the load center of the leg type mobile robot in the forward-and-backward direction can be performed.

Here, it is preferable that at least one of the ground areas is curved upward as the ground area separates from the second joint.

As described above, the bottom shape of the ground area is curved upward as the ground area separates from the second joint. Thereby the ground area can be suitably secured even when the foot portion is grounded on the floor surface in a state where the foot portion is inclined to the floor surface. Also, frictional force between the floor surface and the foot portion can be secured by enlarging the ground area.

Additionally, it is preferable that the foot portion includes a first sole member generating frictional resistance between the floor surface and the first sole member at the time of being grounded as the ground area.

Thus, the foot portion is hardly slippery on the floor surface, and thereby slip can be prevented. The force of the leg part of the leg type mobile robot can be efficiently transmitted to the floor surface.

Here, it is preferable that a first intermediate member for attenuating the vibration of the plate spring part when the first sole member is grounded between the plate spring part and the first sole member.

As described above, the vibration of the plate spring part generated when the first sole member is grounded can be attenuated by the first intermediate member, and the instability of the posture of the leg type mobile robot associated with the vibration of the plate spring part can be prevented.

Furthermore, it is preferable that the first intermediate member allows a displacement in the direction of the floor surface to the plate spring part of the first sole member when the first sole member is grounded.

As described above, the displacement of a ground position in the first sole member associated with the bending of the plate spring part can be suppressed.

Additionally, it is preferable that the foot portion includes a second sole member generating frictional resistance between the floor surface and the second sole member at the time of being grounded above the first sole member.

As described above, even when parts other than the first sole member provided on a normal ground area are grounded at the time of moving on the floor surface with level differences such as stairs, the second sole member is grounded, and thereby slip can be prevented. The force of the leg part of the leg type mobile robot can be efficiently transmitted to the floor surface.

Furthermore, it is preferable that a second intermediate member for attenuating the vibration of the plate spring part when the second sole member is grounded is provided between the plate spring part and the second sole member.

As described above, the vibration of the plate spring part generated when the second sole member is grounded can be attenuated by second intermediate member, and the instability of the posture of the leg type mobile robot associated with the vibration of the plate spring part can be prevented.

Furthermore, it is preferable that the second intermediate member allows a displacement in the direction of the floor surface to the plate spring part of the second sole member when the second sole member is grounded.

As described above, the displacement of a ground position in the second sole member associated with the bending of the plate spring part can be suppressed.

Additionally, it is preferable that the foot portion includes a base part, and the plurality of plate spring parts extending downward from the base part and having the ground area formed at the side of the bottom surface.

As described above, the foot portion having a plurality of plate spring parts can be obtained with a simple structure. Although the plate spring part and the base part may be separately formed, the plate spring part and the base part may be integrally formed. Particularly, the number of components can be further reduced and the structure of the foot can be simplified by integrally forming the plate spring part and the base part.

Furthermore, it is preferable that four plate spring parts are provided; the two plate spring parts extend forward from the base part; the two remaining plate spring parts extend backward from the base part; and the four plate spring parts and the base part are formed into a nearly letter H-shape.

Herein, the term "nearly letter H-shape" means that a pair of plate spring parts respectively provided forward and backward may be mutually parallel, and the plate spring parts are provided so as to be slightly opened toward a tip part.

For example, the operation of the two-feet mobile robot imitating a human is performed so that the two-feet mobile robot lands from the back side (heel part) of the foot portion, and kicks at the front side (tiptoe part) so as to imitate the walk of a human. Since the ground areas of the leg type mobile robot of claim 12 are arranged at the front and back sides, the control is suitably performed. When the leg type mobile robot moves forward, the load center of the leg type mobile robot moves in the forward-and-backward direction of the leg type mobile robot, and a control for moving the load center to an ideal position is performed. Therefore, the leg type mobile robot of claim 12 plants its feet using the front and back ground areas, and the control for moving the load center of the leg type mobile robot in the forward-and-backward direction can be performed. When the pair of plate spring parts are provided so that the plate spring parts are slightly opened toward a tip part, the leg type mobile robot plants its feet effectively even when the leg type mobile robot is inclined to the right and left and the load is shifted in the lateral direction.

Additionally, it is preferable that the plate spring part is made of a composite member reinforced with fiber.

Examples of the "composite member reinforced with fiber" in the present invention include a fiber reinforced plastic (FRP) obtained by reinforcing a plastic using a fiber for reinforcing. As the fiber for reinforcing, a carbon fiber, a glass fiber, an organic fiber and a metal fiber or the like can be suitably used. Thus, the weight of the plate spring part itself can be reduced by forming the plate spring part from the "composite member reinforced by fiber".

Furthermore, it is preferable that the plate spring part includes a plurality of layers having a different modulus of elasticity.

As described above, the vibration of the plate spring part when the leg type mobile robot moves can be attenuated, and the posture of the leg type mobile robot can be stabilized.

Still furthermore, it is preferable that the plate spring part includes multilayered plate springs and a viscous member interposed between the plate springs.

As described above, the vibration of the plate spring part when the leg type mobile robot moves can be attenuated, and the posture of the leg type mobile robot can be stabilized.

Here, it is preferable that a leg type mobile robot is provided with an attenuation means for attenuating the vibration of the plate spring part.

As described above, the vibration of the plate spring part when the leg type mobile robot moves can be attenuated, and the posture of the leg type mobile robot can be stabilized. The first intermediate member and the second intermediate member are also an example of the attenuation means. In addition, a damper device or the like using liquid pressure can be applied as the attenuation means. According to the damper device or the like, the vibration of the plate spring part generated when the foot portion separates from the floor surface can also be attenuated.

Additionally, it is preferable that a plurality of plate spring parts are provided, and a connection part for connecting the two plate spring parts is provided.

As described above, the spring characteristics, particularly rigidity of the foot portion can be adjusted. The connection part may be integrally formed with the plate spring part, and the connecting member separately formed from the plate spring part may be attached and fixed to each plate spring part. The shape, installing place and number or the like of the connection part can be suitably changed.

Furthermore, it is preferable that the foot includes a floor reaction force detecting means for detecting floor reaction force acting from the floor surface via the foot portion.

The floor reaction force detecting means in the present invention detects the floor reaction force inputted via the foot portion, in detail at least one of translation force of the floor reaction force and moment of the floor reaction force. At least one axial translation force or moment (for example, the force $F_z$ of the axial direction perpendicular to the floor surface) may be detected.

Thus, the floor reaction force can be detected at a place nearer to the ground area by providing the floor reaction force detecting means on the foot, and the floor reaction force can be more correctly detected.

Still furthermore, it is preferable that the floor reaction force detecting means is a unitized floor reaction force detector.

In the present invention, the term "unitized" means the construction having incorporated parts in one case. That is, the floor reaction force detector has the parts of the floor reaction force detecting means incorporated in the case. Thus, the foot is easily assembled by using the unitized floor reaction force detector.

Additionally, it is preferable that the foot portion is fixed to the floor reaction force detector.

As described above, the weight of the foot of the leg type mobile robot can be further reduced, and the foot can be simplified.

Furthermore, it is preferable that the foot portion includes the plurality of ground areas; the center of the second joint is offset to a position where a distance to the remotest point of the plurality of ground areas is minimum in a plane view; and the center of the floor reaction force detector is provided so as to be closer to a position where a distance to the remotest point of the plurality of ground areas is minimum in a plane view than the center of the second joint.

In the leg type walking robot described in Japanese unexamined patent publication No. 2003-71776, the center of the second joint is offset to the ground area in a plane view, and the center of the second joint and the center of the floor reaction force detector are provided at the same position in a plane view. In claim 21, since the center of the floor reaction force detector is offset to the center of the second joint in a plane view, and the center of the floor reaction force detector is brought close to a position where a distance to the remotest point of a plurality of ground areas is minimum, the value of the floor reaction force detected can be reduced, and the floor reaction force detector can be miniaturized.

still furthermore, it is preferable that the foot portion includes the plurality of ground areas; and the floor reaction force detector is provided at a position where a distance to the remotest point of the plurality of ground areas is minimum in a plane view.

As described above, the value of the floor reaction force detected can be reduced by setting the position of the floor reaction force detector, and the floor reaction force detector can be miniaturized. Since the maximum value of the floor reaction force inputted can be suppressed, the floor reaction force detector hardly fails. The case of the floor reaction force detector may be provided at the position described above, and the position of the case can be changed within the range where a part of the case is located at the position described above. Particularly, in view of the miniaturization of the floor reaction force detector, it is preferable that the center of the floor reaction force detector is provided at a position where a distance to the remotest point of the plurality of ground areas is minimum in a plane view.

Here, it is preferable that the floor reaction force detecting means is a distortion detecting means for detecting the distortion of the plate spring part.

The distortion detecting means in the present invention detects the distortion of the plate spring part, and examples thereof include one using a distortion gauge and a piezoelectric element or the like. The plate spring part receives floor reaction force and bends (distort), and the amount of the distortion correlates with the floor reaction force. Therefore, the floor reaction force can be detected by detecting the distortion of the plate spring part.

Thus, since the floor reaction force is detected by detecting distortion of the plate spring part, the construction of the foot can be further simplified.

The state of the floor surface can be detected by detecting the distortion of the plate spring part.

The present invention can provide the leg type mobile robot capable of absorbing the shock at the time of landing, reducing the weight of the foot and simplifying the foot.

BRIEF DESCRIPTION OF THE DRAWINGS

FIG. 5 is a bottom view showing a foot of a two-feet walking robot according to the first embodiment.

FIG. 8 is a schematic view for explaining the case where the two-feet walking robot according to the first embodiment moves on a floor surface with level differences.

FIGS. 9A and 9B are schematic views for explaining the case where the two-feet mobile robot according to the first embodiment moves at high speed.

DESCRIPTION OF THE PREFERRED EMBODIMENTS

Figure 1:
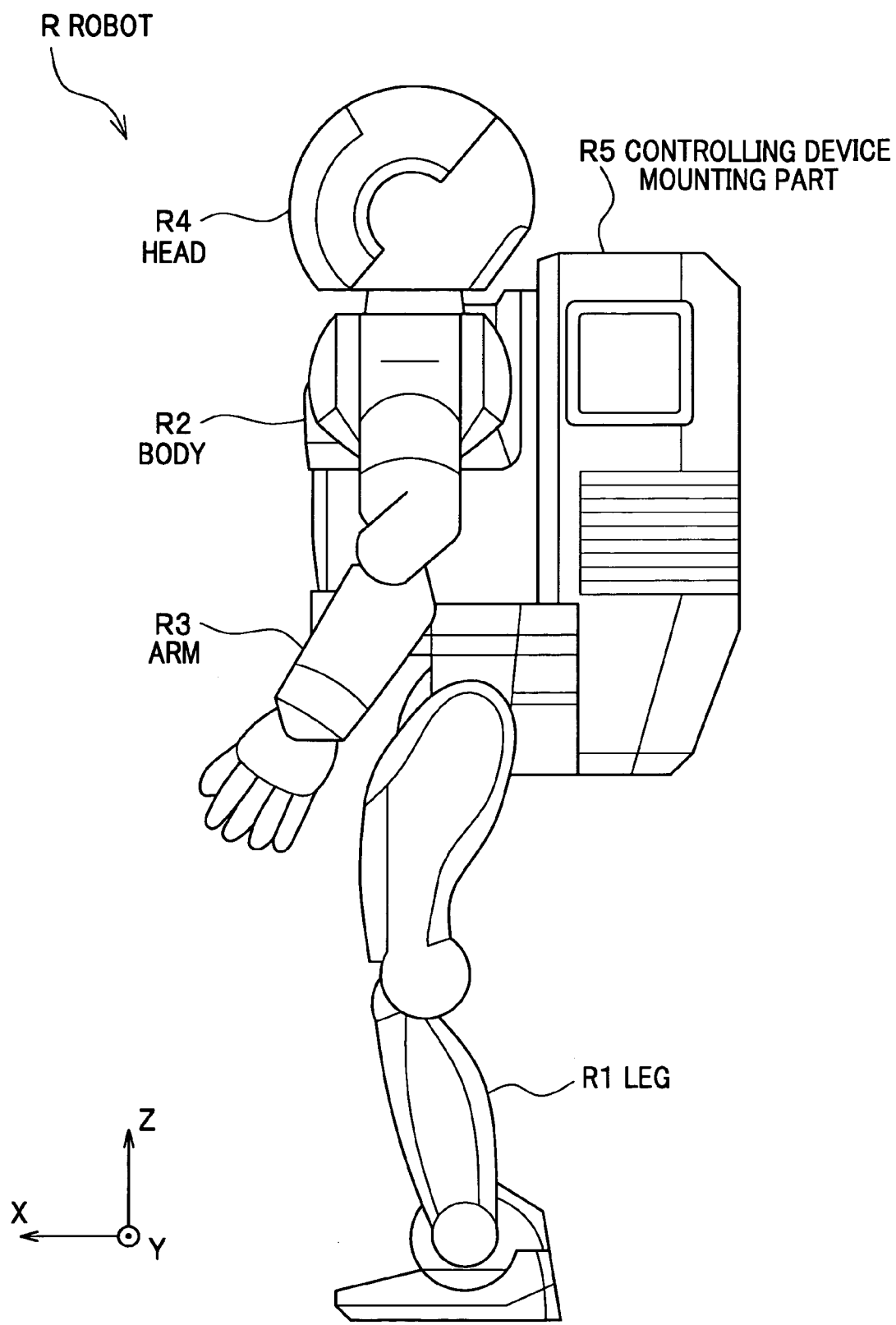
FIG. 1 is a side view showing a two-feet mobile robot according to the present invention.

Hereinafter, the embodiment of the present invention will be described in detail with reference to the drawings by using a case where the construction of the leg type mobile robot of the present invention is applied to an autonomously movable two-feet mobile robot as an example. Identical components are designated by the same reference numerals, and the overlapping description is omitted. The forward-and-backward direction, lateral direction and vertical direction of the two-feet mobile robot are respectively set to the X-axis, the Y-axis and the Z-axis, respectively. Expressions for the position and direction or the like of the two-feet mobile robot are described on the basis of a state where the two-feet mobile robot takes a standing posture.

<Two-Feet Mobile Robot R>

First, the two-feet mobile robot of the present invention is described with reference to FIG. 1. FIG. 1 is a side view showing a two-feet mobile robot according to the present invention.

As shown in FIG. 1, a two-feet mobile robot (hereinafter referred simply to as "robot") R stands and moves (walks and runs or the like) using two legs R1 (only one leg is shown) in the same manner as a human. The two-feet mobile robot has an body R2, two arms R3 (only one arm is shown) and a head R4, and is an autonomously mobile robot. The robot R is provided with a controlling device mounting part R5 for controlling the operation of the legs R1, the body R2, the arms R3 and the head R4 so that the controlling device mounting part R5 is abutted against the back (behind the body R2).

<Joint Structure of Leg Part R1>

Figure 2:
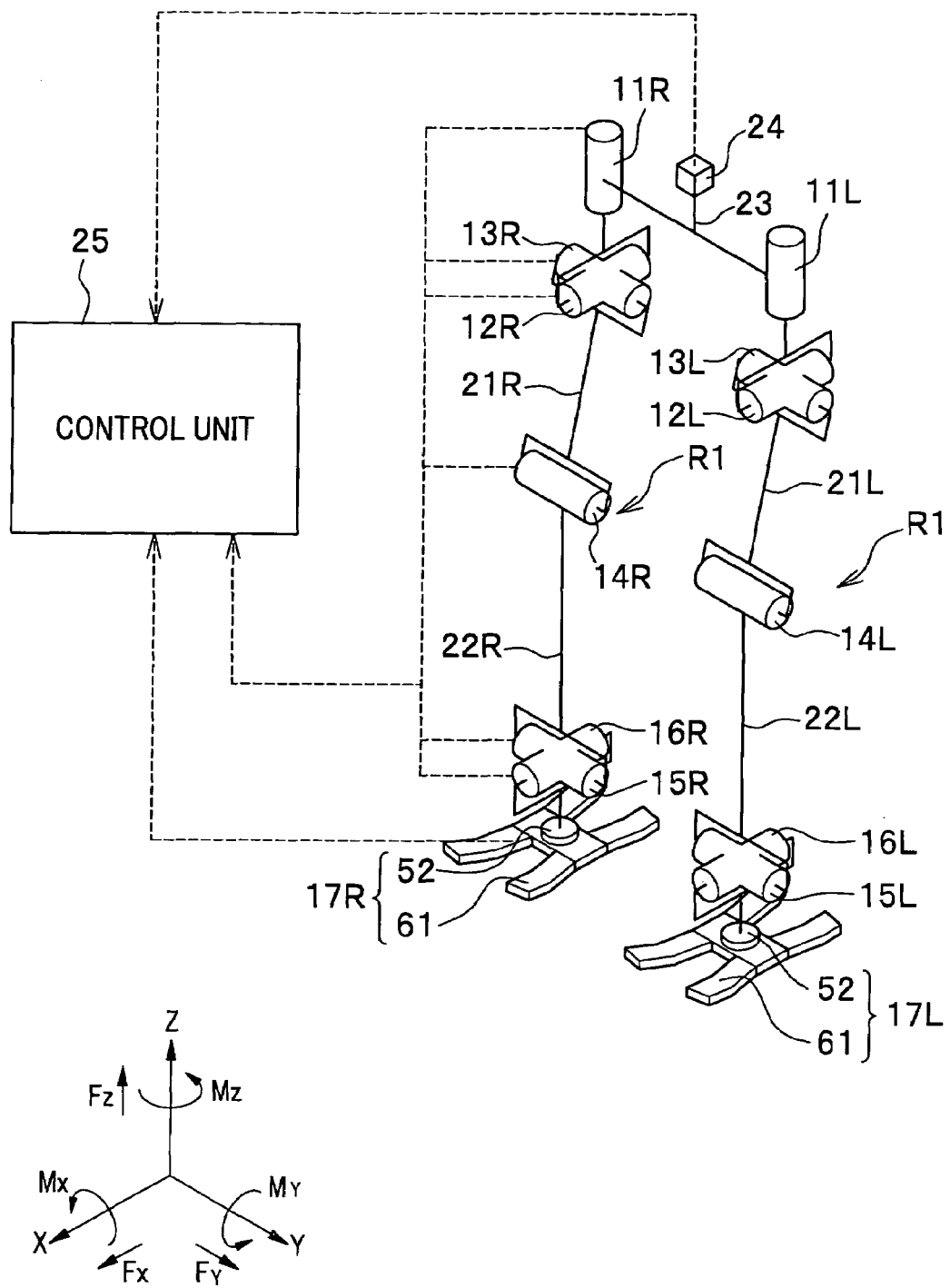
FIG. 2 is a schematic view showing the joint structure of a leg part shown in FIG. 1.

Next, the joint structure of the leg R1 of the robot R is described with reference to FIG. 2. FIG. 2 is a schematic view showing the joint structure of a leg part shown in FIG. 1. As shown in FIG. 2, the robot R is provided with the right and left legs R1 having six joints 11R(L) to 16R(L) respectively. The right and left twelve joints are composed by hip joints 11R and 11L (the right side is set to R and the left side is set to L, and so on) for rotating the legs (around the Z-axis) provided at a hip part, hip joints 12R and 12L around a roll axis (X-axis) of the hip part, hip joints 13R and 13L around a pitch axis (Y-axis) of the hip part, knee joints 14R and 14L around a pitch axis (Y-axis) of a knee part, ankle joints 15R and 15L around a pitch axis (Y-axis) of an ankle, and ankle joints 16R and 16L around a roll axis (X-axis) of the ankle. Feet parts 17R and 17L are attached to the lower part of the leg R1.

That is, the leg R1 is provided with the hip joints 11R(L), 12R(L) and 13R(L), the knee joint 14R(L) and the ankle joints 15R(L) and 16R(L). The hip joints 11R(L) to 13R(L) and the knee joint 14R(L) are connected by thigh links 21R, 21L, and the knee joint 14R(L) and the ankle joint 15R(L) and 16R(L) are connected by the shank links 22R and 22L.

The hip joints 11R(L) to 13R(L) are an example of the "first joint" in the claims, and the ankle joints 15R(L) and 16R(L) are an example of the "second joint" in the claims.

The leg R1 is connected to the body R2 via the hip joints 11R(L) to 13R(L). FIG. 2 shows a connection part of the leg R1 and the body R2 as an body link 23 simply. An inclination sensor 24 is installed on the body R2, and detects the inclination and angular velocity to the direction of the Z-axis (perpendicular axis) of the body R2. A rotary encoder (not shown) for detecting the amount of rotation is provided on an electric motor for driving each joint.

When this construction is employed, a total of twelve freedom degrees can be transmitted to the right and left feet of the leg R1. A desired movement can be transmitted to the whole leg (the leg R1 and foot 17) by driving the twelve (6*2) joints at a proper angle during walking, and the robot can walk in three-dimensional space arbitrarily (herein, "*" means multiplication).

As shown in FIG. 2, a known force sensor 52 is provided below the ankle joints 15R(L) and 16R(L). The sensor 52 detects the three direction ingredients Fx, Fy and Fz of the floor reaction force acting on the robot R from the floor surface, and the three direction ingredients Mx, My and Mz of the moment among the external force acting on the robot R. A signal with respect to the floor reaction force, moment, inclination and angular velocity or the like detected by the force sensor 52 and the inclination sensor 24 or the like is transmitted to a control unit 25 provided in the control device mounting part R5, and is used for controlling the posture and operation or the like of the robot R. The control unit 25 calculates a joint drive control value based on data stored in a memory (not shown) and the inputted detection signal, and drives the joint.

<Foot Part 17 of Robot R>

The foot 17R(L) of the robot R is attached to the end part (floor surface side) of the leg R1 via the ankle joints 15R(L) and 16R(L), and is provided with the force sensor 52 and a foot plate member 61. Since the left leg (the left leg R1 and the foot 17L) and the right leg (the right leg R1 and the foot 17R) are symmetrical, R and L are removed when there is no necessity, as hereinafter described.

First Embodiment

Figure 3:
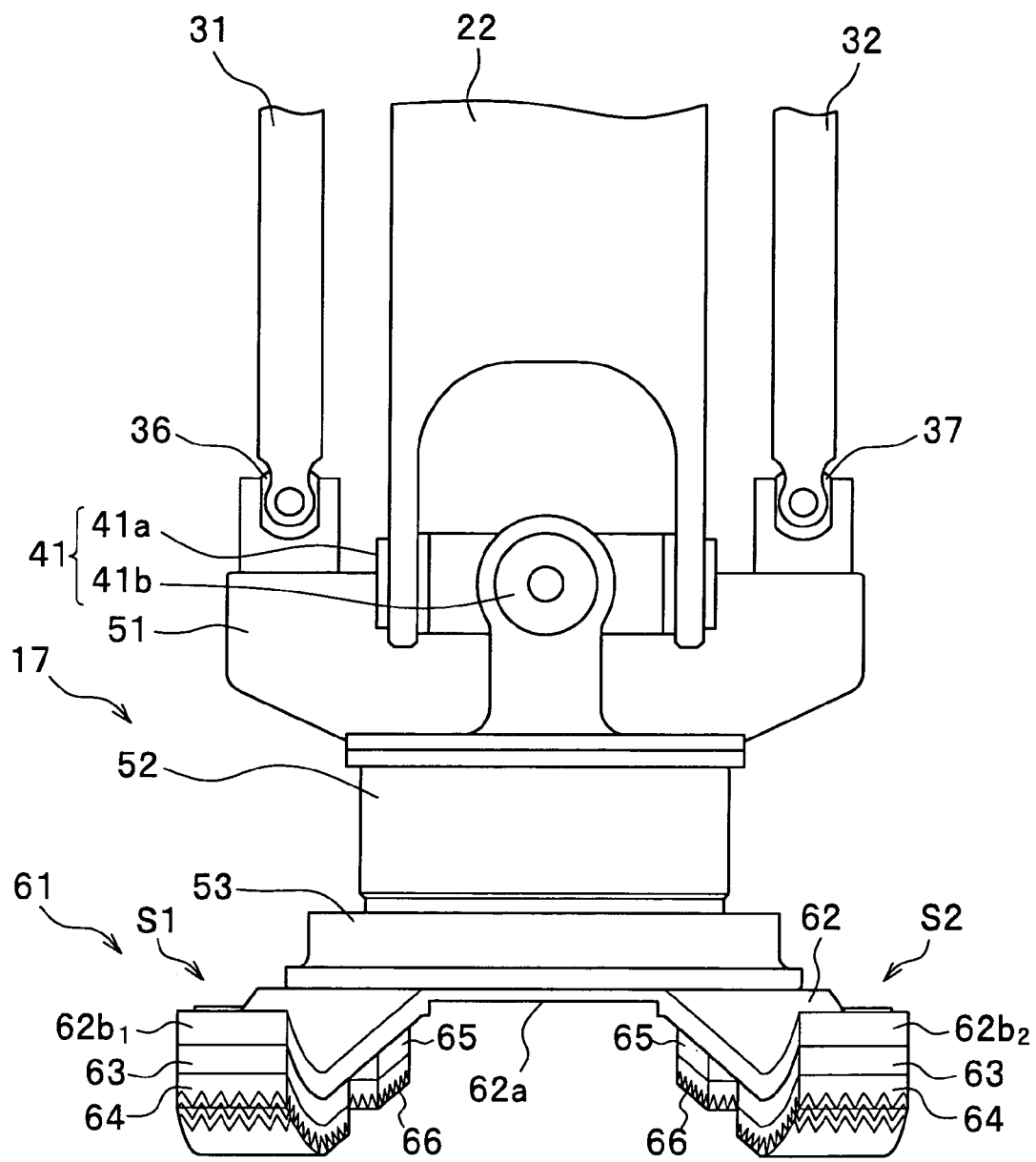
FIG. 3 is a front view showing a foot of the two-feet walking robot according to the first embodiment.
Figure 4:
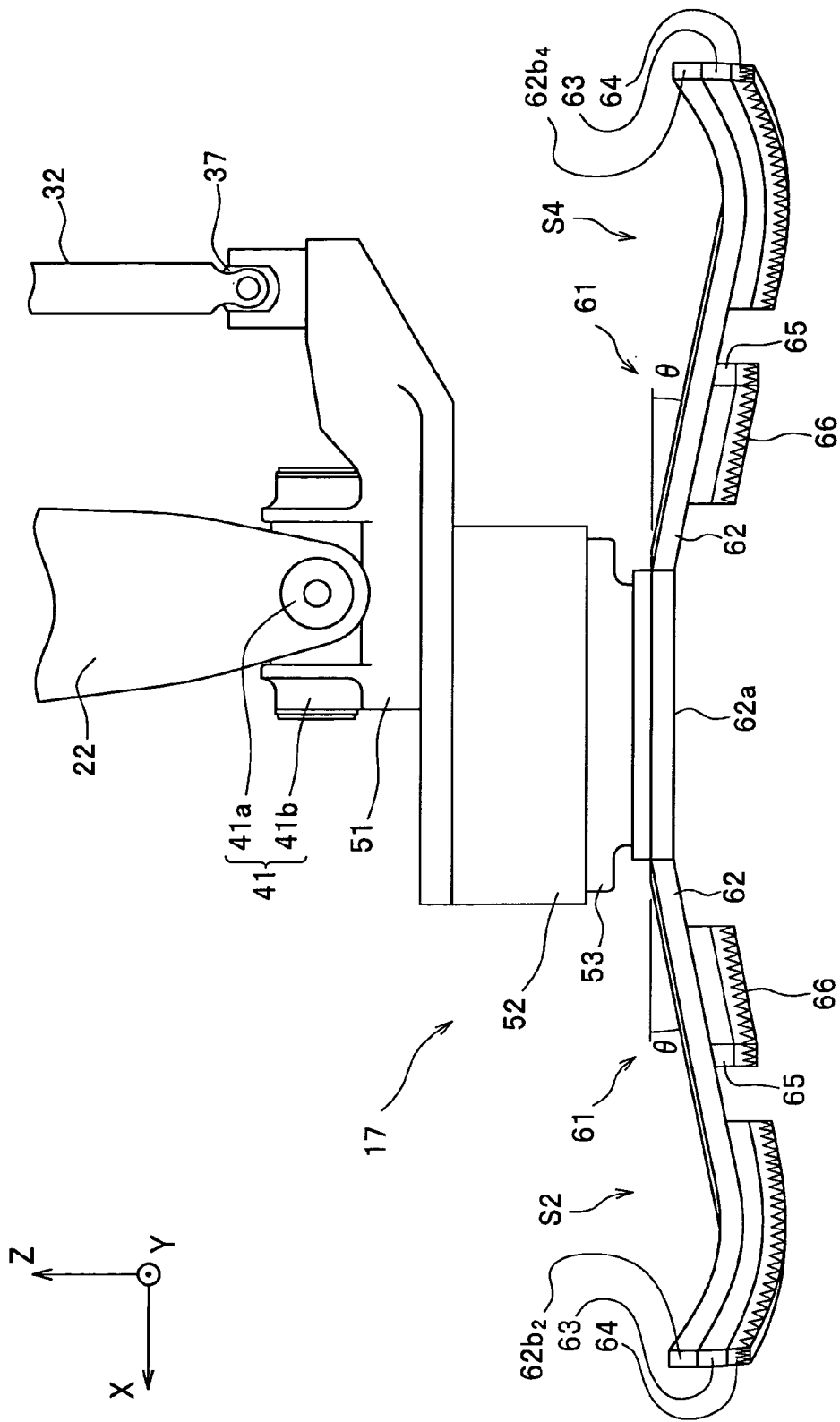
FIG. 4 is a side view showing the foot of the two-feet walking robot according to the first embodiment.

First, the foot 17 of the robot R according to the first embodiment of the present invention is described with reference to FIG. 3 to FIG. 5. FIG. 3 is a front view showing a foot of the two-feet mobile robot according to the first embodiment of the present invention. FIG. 4 is a side view showing the foot of the two-feet mobile robot according to the first embodiment of the present invention. FIG. 5 is a bottom view showing a foot of a two-feet mobile robot according to the first embodiment of the present invention. The leg R1 and the foot 17 shown in FIG. 3 to FIG. 5 are shown in a state where an armoring part of the robot R shown in FIG. 1 are suitably removed. The left leg of the robot R (the left leg R1 and the foot 17L) is shown in FIG. 3 to FIG. 5.

<<Ankle Joint of Robot R>>

Herein, with reference to FIG. 3 and FIG. 4, the ankle joints 15 and 16 of the robot R are simply described. The ankle joints 15 and 16 of the robot R are composed by connecting a cross shaft 41 to the shank link 22 and a first base seat part 51 of the foot 17.

The cross shaft 41 is obtained by combining an axis 41a using a Y-axis as a rotational axis and an axis 41b using an X-axis as the rotational axis in a cross shape. The both end parts of the axis 41a are rotatably supported by the shank link 22. The both end parts of the axis 41b are rotatably supported by the first base seat part 51. That is, the axis 41a corresponds to the ankle joint 15, and the axis 41b corresponds to the ankle joint 16.

A first rod 31 and a second rod 32 are provided in the oblique rear of the shank link 22. The first rod 31 is provided in the right oblique rear of the shank link 22, and is connected to the first base seat part 51 via the cross shaft 36. The second rod 32 is provided in the left oblique rear of the shank link 22, and is connected to the first base seat part 51 via the cross shaft 37. The first rod 31 and the second rod 32 are advanced and retreated up and down by transmitting the driving force generated by the rotation of an electric motor provided above the first rod 31 and the second rod 32 (for example, the shank link 22 and the thigh link 21 or the like) via a reduction gear. Thereby, the first rod 31 and the second rod 32 move the ankle joints 15 and 16, and maintain the ankle joints 15 and 16 at a predetermined angle.

For example, the first rod 31 and the second rod 32 are advanced downward when the tiptoe part of the foot 17 is to be raised, and the first rod 31 and the second rod 32 are retreated upward when the heel part of the foot 17 is raised. The rod of the side to be left is retreated upward and the rod of the other side is advanced downward when either of the right and left of the foot 17 is raised from the floor surface. The operation of the first rod 31 and second rod 32 is controlled by the control unit 25.

<<Foot Part 17 of Robot R>>

As shown in FIG. 3 to FIG. 5, the foot 17 of the robot R is provided with the first base seat part 51, the force sensor 52, the second base seat part 53 and the foot flat member 61 sequentially from above (ankle joint side).

The first base seat part 51 is provided on the upper part of the foot 17, and is connected to the ankle joints 15 and 16.

As described above, the force sensor 52 detects the translation force of the floor reaction force of three directions, and the moment of the floor reaction force of three directions. Each part is stored in the case (unitized). In the embodiment, the first base seat part 51 and the force sensor 52 are fixed by a plurality of bolts (not shown). The output of the force sensor 52 is inputted into the control unit 25 via a harness.

The force sensor 52 is an example of "floor reaction force detecting means" in the claims, and is also an example of a "floor reaction force detector."

The second base seat part 53 is provided below the force sensor, i.e., between the force sensor 52 and the foot flat member 61, and fixes the force sensor 52 and the foot flat member 61 to each other. In the embodiment, the force sensor 52 and the second base seat part 53 are fixed by a plurality of bolts (not shown), and the second base seat part 53 and the foot flat member 61 are fixed by a plurality of bolts (not shown). Thus, since the force sensor 52 and the foot flat member 61 are fixed via the second base seat part 53, the structure of the foot 17 can be simplified and the weight of the foot 17 can be reduced. The assembling structure of each member of the foot 17 is not limited to the above structure.

The foot flat member 61 is a member attached to the lower part of the second base seat part 53, and constitutes the main part of the foot portion grounded on the floor face. The foot flat member 61 is an example of the "foot portion" in the claims.

The foot flat member 61 is provided with a plate spring body 62, a first intermediate member 63, a first sole member 64, a second intermediate member 65 and a second sole member 66.

The plate spring body 62 is a part supporting the empty weight of the robot R while bending, and is mainly composed by a base part 62a and a spring part 62b extending from the base part 62a. In the embodiment, the plate spring body 62 is integrally formed in the shape where the base end part of the spring part 62b is connected to the base part 62a.

The base part 62a has a flat plate shape, and has a shape along the bottom surface of the second base seat part 53. The base end part of the spring part 62b to be described later is connected to the base 62a, and the spring part 62b functions as a plate spring using the connection part with the base 62a as the base end part.

The spring part 62b extends downward at an angle ,, (see FIG. 4) from the end part of the base part 62a. In the embodiment, four spring parts $62b_1$, $62b_2$, $62b_3$, and $62b_4$ are used. The spring parts $62b_1$ and $62b_2$ extend forward (the tiptoe direction) from the base part 62a, and the spring parts $62b_3$ and $62b_4$ extend backward (the heel direction) from the base part 62a. It is preferable that the spring parts $62b_1$, $62b_2$, $62b_3$ and $62b_4$ have the same shape, the same intensity and the same performance (elastic modulus).

It is preferable that the angle ,, is set to the minimum angle where the base part 62a is not grounded on the floor surface when the maximum floor reaction force Fz acts. Herein, for example, the maximum floor reaction force Fz means a reaction force acting when the robot R runs at top speed and one leg is grounded on the floor surface. The empty weight of the robot R is supported by the elastic force of the spring part 62b ($62b_1$ to $62b_4$) by the set. In addition, the set can prevent the base part 62a from being grounded on the floor surface, and the adverse influence to the force sensor 52 can be prevented.

The plate spring body 62 is required only to be a material capable of making the spring part 62b function as a plate spring, and may be made of a metal member (steel, aluminium alloy and magnesium alloy or the like). Particularly, when the plate spring body 62 is made of a composite member (fiber reinforced plastic or the like) reinforced with fiber, the weight of the plate spring body 62 can be reduced while desired intensity and rigidity are acquired. In this case, the intensity of the spring part 62b can be secured by coinciding the fiber direction of the fiber for reinforcing with the direction (longitudinal direction) to the tip part from the base end part of the spring part 62b.

Anisotropy can be transmitted by changing the fiber direction of each spring part 62b, and the spring characteristics of each spring part 62b can also be changed.

A carbon fiber, a glass fiber, an organic fiber, a metal fiber or the like are preferable as the fiber for reinforcing. It is preferable that the plate spring body 62 is a member integrally formed. The number of components can be further reduced and the structure of the foot can be simplified by integrally forming the plate spring body 62 having a construction in which a plurality of spring parts 62b (four pieces in the embodiment) are attached to one base 62a.

The first intermediate member 63 is an attenuating member attached to a part corresponding to the bottom surface or ground area of the spring part 62b, i.e., the side of the lower end part (the same as the side of the tip part in the embodiment). The first intermediate member 63 has a function for attenuating the vibration of the spring part 62b generated at the time of being grounded. The intermediate member 63 is also an example of the "attenuation means" in the claims. It is preferable that the intermediate member 63 is made of a material provided with an attenuation function. For example, it is preferable that the intermediate member 63 is made of a foaming resin or the like. A damper device using liquid pressure or the like may be installed as the attenuation means instead of the first intermediate member 63. The damper device can be used in combination with the first intermediate member 63.

The first sole member 64 is attached to the bottom surface of the first intermediate member 63, and is located at the lower end part of the foot flat member 61. The first sole member 64 is actually grounded on the floor surface at the time of moving. The first sole member 64 fulfills a non-slip function owing to resistance generated between the first sole member 64 and the floor surface. It is preferable that the first sole member 64 is made of a material having the non-slip function. For example, the first sole member made of rubber is preferable. The bottom surface of the first sole member 64 is the "ground area" in the claims.

The second intermediate member 65 is an attenuating material attached to the intermediate part of the bottom surface of the spring part 62b. The second intermediate member 66 has a function for attenuating the vibration of the spring part 62b generated when the second sole member 66 to be described is grounded. It is preferable that the second intermediate member 65 is made of a material having the attenuation function in the same manner as the first intermediate member 63, for example, a member made of a foaming resin or the like.

The second sole member 66 is attached to the bottom surface of the second intermediate member 65. The second sole member 66 fulfills the a non-slip function owing to the frictional resistance generated between the first sole member 64 and the floor surface in the same manner as the above first sole member 64. The second sole member 66 is located above the first sole member 64.

In the embodiment, four plate spring parts S1, S2, S3, and S4 are respectively composed by the spring part 62b. In detail, the spring part S1 is composed by the spring part $62b_1$, and the plate spring part S2 is composed by the spring part $62b_2$. The plate spring part S3 is composed by the spring part $62b_3$, and the plate spring part S4 is composed by the spring part $62b_4$. When the first sole member 64 provided at the tip of each of the plate spring parts S1, S2, S3, and S4 is grounded, the plate spring parts S1, S2, S3, and S4 elastically deform, and the empty weight of the robot R, more particularly, the whole load due to the structure above the spring part 62b of the robot R is supported by the plate spring parts S1, S2, S3, and S4 elastically deformed. Therefore, in spite of the simple construction, the empty weight of the robot R can be supported, and further the shock due to the floor reaction force can be absorbed. The moving (walking and running) speed of the robot R can be enhanced by enhancing impact absorptivity.

The elastic member or the like becomes unnecessary, and the weight of the foot 17 can be reduced. Since the inertia force to the leg R1 is reduced by the reduction of the weight, the leg R1 has a structure suitable for high-speed movement.

The plate spring parts S1, S2, S3, S4 and the base part 62a are arranged in a nearly letter H-shape in a plane view. When this construction is employed, two ground areas are respectively arranged at the front and back sides, and the spring characteristics of the plate spring parts S1, S2, S3 and S4 arranged so as to extend in the forward-and-backward direction respectively are suitable for load control in the forward-and-backward direction. Thereby, the foot flat structure is suitable for the control of the two-feet movement, and the control for planting its feet using the front and back ground areas and moving the load center of the robot R in the forward-and-backward direction. Since the plate spring parts S1 and S2 and the plate spring parts S3 and S4 are provided so as to slightly opened toward the tip part, the robot R plants its feet effectively even when the robot R is inclined to right and left and the load is shifted in the right-and-left direction.

When the shape of the floor surface has unevenness, either of the plate spring parts S1 to S4 may be raised from the floor surface (is not grounded). In such a case, the bending spring characteristics (roll rigidity and pitch rigidity) of the plate spring parts S1 to S4 are nonlinearly changed. Therefore, the control unit 25 corrects a target foot flat position posture so that all the plate spring parts S1 to S4 are grounded and bent based on the signal from the force sensor 52. The control unit 25 controls so that the robot R takes a posture for generating target floor reaction force. The amount of correction of the target foot flat position posture is calculated by a nonlinear operation according to the left condition of the plate spring part estimated from the detection value of the force sensor 52.

Figure 6A:
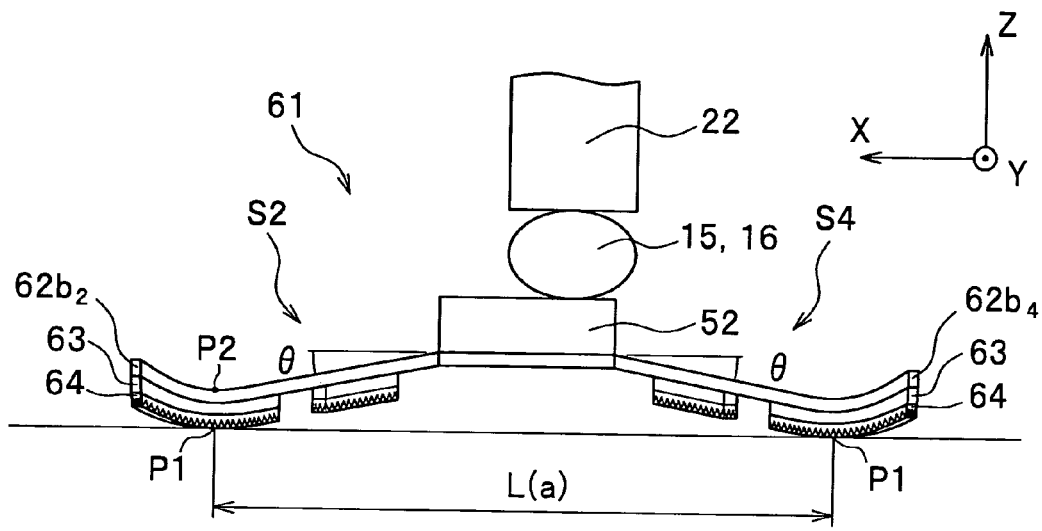
FIGS. 6A-6D are schematic views for explaining an example of the grounding state of the foot of the two-feet walking robot according to the first embodiment.
Figure 6B:
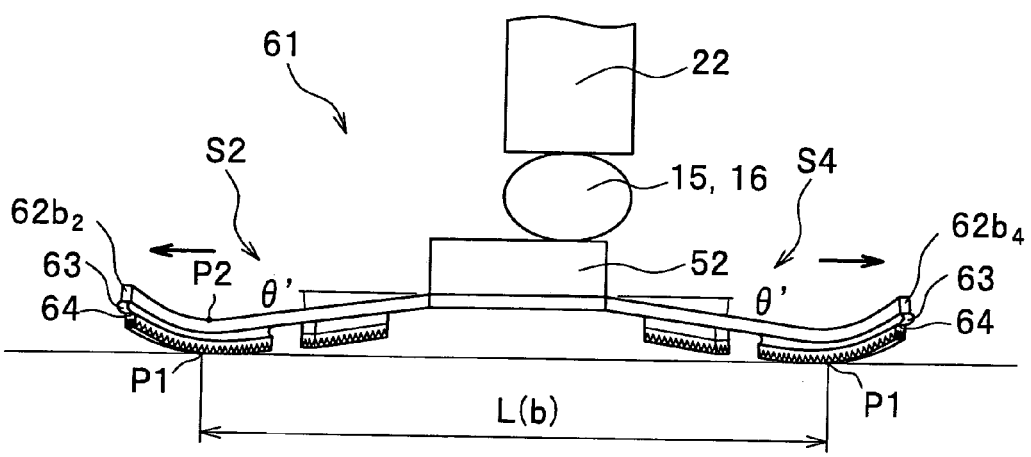
Figure 6C:
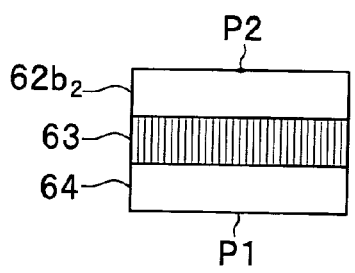
Figure 6D:
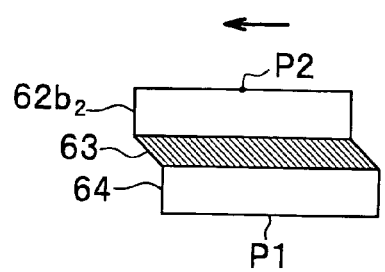

Herein, the case where the foot 17 of the robot R is taken down directly below and grounded is described with reference to FIG. 6. FIG. 6 is a schematic view for explaining an example of the ground state of the foot of the two-feet mobile robot according to the first embodiment. FIG. 6(a) shows the initial time of the ground, and FIG. 6(b) shows the state where the empty weight of the robot is added. FIG. 6(c) shows a primary enlarged schematic view of FIG. 6(a), and FIG. 6(d) shows a primary enlarged schematic view of FIG. 6(b).

First, as shown in FIG. 6(a), the first sole member 64 (ground area) provided at the tip of each of the plate spring parts S1, S2, S3 and S4 (only S2 and S4 are shown) is evenly grounded. When the load is further added to each of the plate spring parts S1 to S4, the floor reaction force acts on each spring part 62b, and the spring part 62b is bent. In this case, the angle of the spring part 62b becomes ,,' (,,'<,,), and a point P2 of the spring part 62b located at the upper side of the ground area is shifted outside to a point P1 of the ground area (see FIGS. 6(c) and (d)). That is, the distance between the ground points P1 and P1 of the sides of the bottom surfaces of the plate spring parts S2 and S4 is spread from L (a) to L (b) (L (b)>L (a)). Herein, when the angle ,, is large, the shift also become larger, and thereby it is preferable to set the angle ,, smaller within the range described above. The first intermediate member 63 also allows the displacement of the direction of the floor surface to the spring part 62b of the first sole member 64. Thereby, as shown in FIG. 6(b), it is possible to suppress the slip of the ground area to the floor surface associated with the bending of the spring part 62b. Therefore, the reaction force and moment due to the slip are inputted into the force sensor 52, and the obstacle to the control of the posture of the robot R can be suppressed. The tolerance and damping capacity of the slip can be suitably set by changing the material and thickness of the first intermediate member 63.

Herein, with reference to FIG. 5, the relationship of a position Pa where the distance to the remotest point of the ground area is minimum, the center Pb of the force sensor, and the center Pc of the ankle joint is described.

In this embodiment, the center Pb (herein, coincides with the sensitivity center of the Z-axial direction of force sensor 52) of the force sensor is provided above a position (occasionally referred to as the center of the ground area) Pa (hereinafter simply described as "position Pa") where the distance to the remotest point is minimum in a plan view (bottom view in FIG. 5) among the ground areas provided at the bottom surface sides of the plate spring parts S1 to S4 in the standing-still state of the robot R. In this embodiment, the distances L1, L2, L3, and L4 between the ground areas of the bottom surfaces of the plate spring parts S1, S2, S3, and S4 and the remotest point are equal.

According to this construction, the maximum value of load acting on the force sensor 52 at the time of moving can be suppressed, and the force sensor 52 can be miniaturized. The force sensor 52 is provided on the foot 17, and is brought close to the ground area. Thereby the floor reaction force and the moment can be more exactly measured.

When the ground areas are arranged so as to form an equilateral polygon, the ground areas are arranged so that the distances between the ground areas and the force sensor 52 become equal. The floor reaction force detector for detecting at least one axial floor reaction force or moment (for example, the translation force Fz of the floor reaction force in the Z-axial direction) may be used instead of the force sensor 52.

In this embodiment, the center Pc of the ankle joint is offset to the position Pa in a plane view. Herein, the intersection of the axis 41a and axis 41b (see FIG. 3) corresponds to the center Pc of the ankle joint. The center Pc of the ankle joint is provided behind the robot R from the position Pa. Thus, the reason why the ankle joints 15 and 16 are offset backward to the ground area of the foot flat member 61 will be described later.

Also, the center Pc of the ankle joint may be further offset to inside the ground area of the foot flat member 61 (the center side of the robot R). The interference of foot flat members 61 of the adjoining feet 17R and 17L can be prevented by offsetting the center Pc of the ankle joint inside, and the stability of the posture of the robot R can be maintained by securing the ground area.

In this embodiment, although the center Pb of the force sensor is provided on the position Pa, the center Pb of force sensor may be provided so that at least the center Pb becomes closer to the position Pa from the center Pc of the ankle joint in a plane view. In other words, the center Pb of the force sensor should be located within a circle C in which the position Pa is set to the center in a plane view, and a length between the position Pa and the center Pc of the ankle joint is set to the radius. For example, the center Pb of the force sensor may be located on a line segment connecting the position Pa and the center Pc of the ankle joint. This construction can also suppress the maximum value of the load acting on the force sensor 52 at the time of moving, and miniaturize the force sensor 52. Particularly, when the center Pb of force sensor is located on the position Pa, the effect for the miniaturization of the force sensor 52 can be maximally achieved.

As shown in FIG. 4, the lower end parts (tip part) of the plate spring parts S1 to S4 are curved upward as the lower end parts separate from the ankle joints 15 and 16, and the first sole member 64 provided on the bottom surface also has the same shape. This is the reason why the robot R is controlled to walk so that the robot R is grounded from the heel part and the floor surface is kicked by the tiptoe part, therefore, the area grounded at the time of being grounded and kicking is enlarged, thereby making it possible to secure the frictional force between the floor surface and the foot. Since the ground area can be secured by the surface, the posture of the robot R is also stabilized.

Figure 7A:
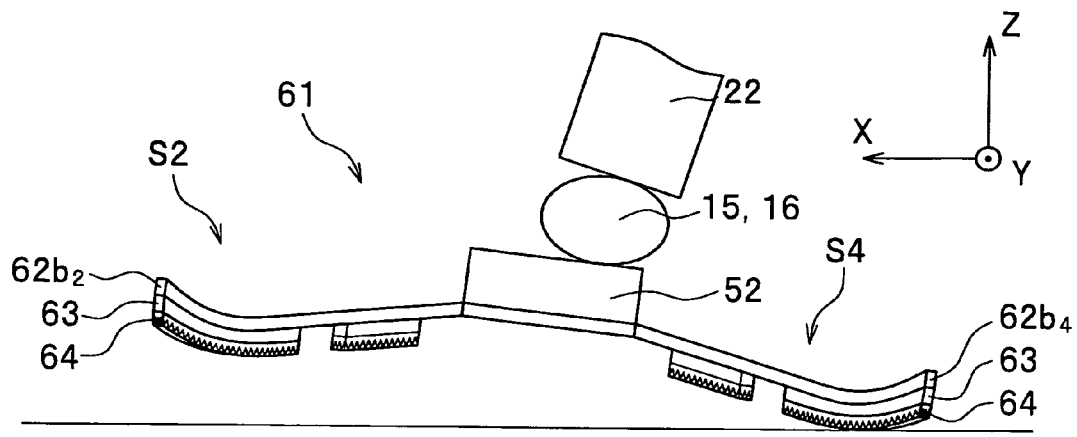
FIGS. 7A-7C are schematic views for explaining the change of the grounding state of a foot portion when the two-feet walking robot according to the first embodiment moves forward (walks).
Figure 7B:
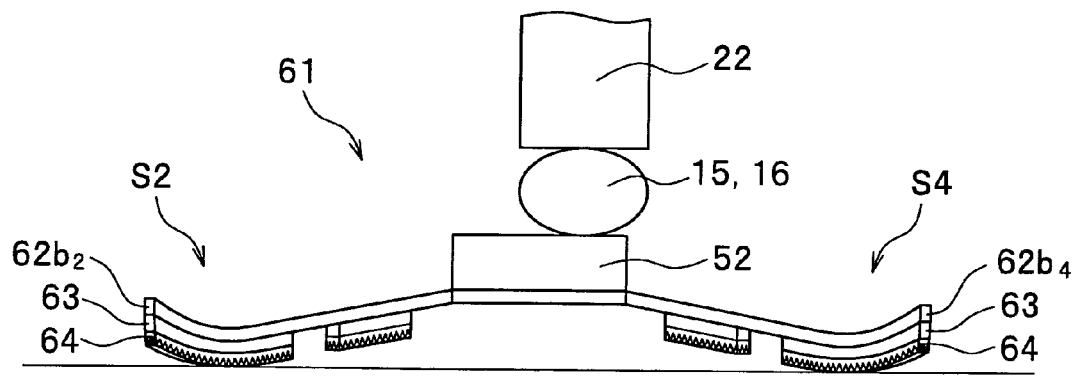

Herein, the change of the ground state of the plate spring parts S1 to S4 when the robot R moves forward (walks) is described with reference to FIG. 7. FIG. 7 is a schematic view for explaining the change of the ground state of a foot portion when the two-feet mobile robot according to the first embodiment moves forward (walks).

Figure 7C:
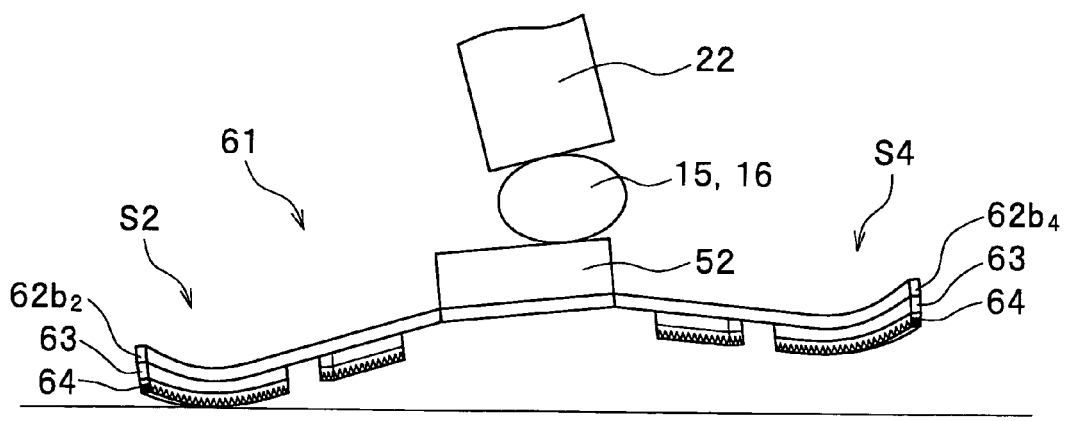

First, when the foot flat member 61 raised in the air is landed, the foot flat member 61 is grounded from the first sole member 64 (ground area) provided on the plate spring parts S3 and S4 of the heel part (FIG. 7(*a*)). The whole ground area of all the plate spring parts S1 to S4 is grounded (FIG. 7(*b*)). The ground areas of the plate spring parts S3 and S4 of the heel part are raised from the ground, and only the ground areas of the plate spring parts S1 and S2 of the tiptoe part are grounded. All the ground areas of the plate spring parts S1 to S4 are raised from the ground by kicking the floor surface (FIG. 7(C)). The operation is performed by the right and left legs R1, thereby the robot R moves forward. Thus, since the lower end parts (tip part) of the plate spring parts S1 to S4 are curved upward, the ground area can be suitably secured even if the foot 17 is inclined to the floor surface at the time of landing (FIG. 7(*a*)) and at the time of kicking (FIG. 7(*c*)). It is preferable that the plate spring part 62*b* is set so that the plate spring part 62*b* is curved upward as the curve separates from the ankle joints 15 and 16 in the moving direction of the robot R, and the curving condition of the tip part of each plate spring part can be suitably changed. At least one of the ground areas should be curved, and all the ground areas may be curved.

Next, the case where the robot R moves on the floor surface with level differences is described. FIG. 8 is a schematic view for explaining the case where the two-feet walking robot according to the first embodiment moves on the floor surface with level differences.

As shown in FIG. 8, when the robot moves on a place with level differences, the part on which the first sole member 64 of the spring part 62*b* (62*b*$_2$ and 62*b*$_4$ are shown) is not provided may be grounded. However, the second sole member 66 is provided on the intermediate part of the spring part 62*b*. Thereby, in such a case, a nonconformity (the generation or the like of slip) due to the ground of the spring part 62*b*, i.e., the plate spring part when the second sole part 66 is grounded can be canceled.

Next, the reason why the ankle joints 15 and 16 are offset to the rear of the ground area of the foot flat member 61 is described by using the case where the robot R moves at high speed (run) as an example. FIG. 9 is a schematic view for explaining the case where the two-feet mobile robot according to the first embodiment moves at high speed. FIG. 9(*a*) shows the case where the ankle joint is offset backward to the foot portion, and FIG. 9(*b*) shows the case where the ankle joint is located at the center of the forward-and-backward direction of the foot portion. The numerals to which "'" is added are used for the same parts as FIG. 9(*a*) in FIG. 9(*b*).

As shown in FIG. 9(*a*), the ankle joints 15 and 16 are offset backward to the foot flat member 61 (bias). In this case, the distance La between the ankle joints 15' and 16' and the front tip of the ground part of the foot flat member 61 becomes longer (La>La'). When the robot R moves at high speed (run), the knee joint 14 is deeply bent, and thereby the state where the floor reaction force F concentrates on the tiptoe part of the foot flat member 61 is generated. At this time, the moment generated on the knee joint 14 becomes F*Lb. On the other hand, as shown in FIG. 9(*b*), the moment generated on the knee joint 14' becomes F'*Lb' when the ankle joints 15' and 16' are located at the center of the forward-and-backward direction of the foot flat member 61'. Herein, since Lb is smaller than Lb', F*Lb<F'*L'b' is satisfied when F is equal to F'. This is satisfied when the ankle joints 15 and 16 are offset in the opposite direction (back in this embodiment) to the relative moving direction (front in this embodiment) to the foot flat member 61 of the knee joint 14 with respect to the foot flat member 61 at the time of driving (bending) the knee joint 14 at the time of high-speed movement. This means that the burden to the knee joint 14 at the time of high-speed movement can be further suppressed when the amount of backward offset of the ankle joints 15 and 16 to the foot flat member 61 is enlarged.

Second Embodiment

Next, for the foot of the robot R according to the second embodiment of the present invention, different points between the first embodiment and the second embodiment are mainly described.

Figure 10:
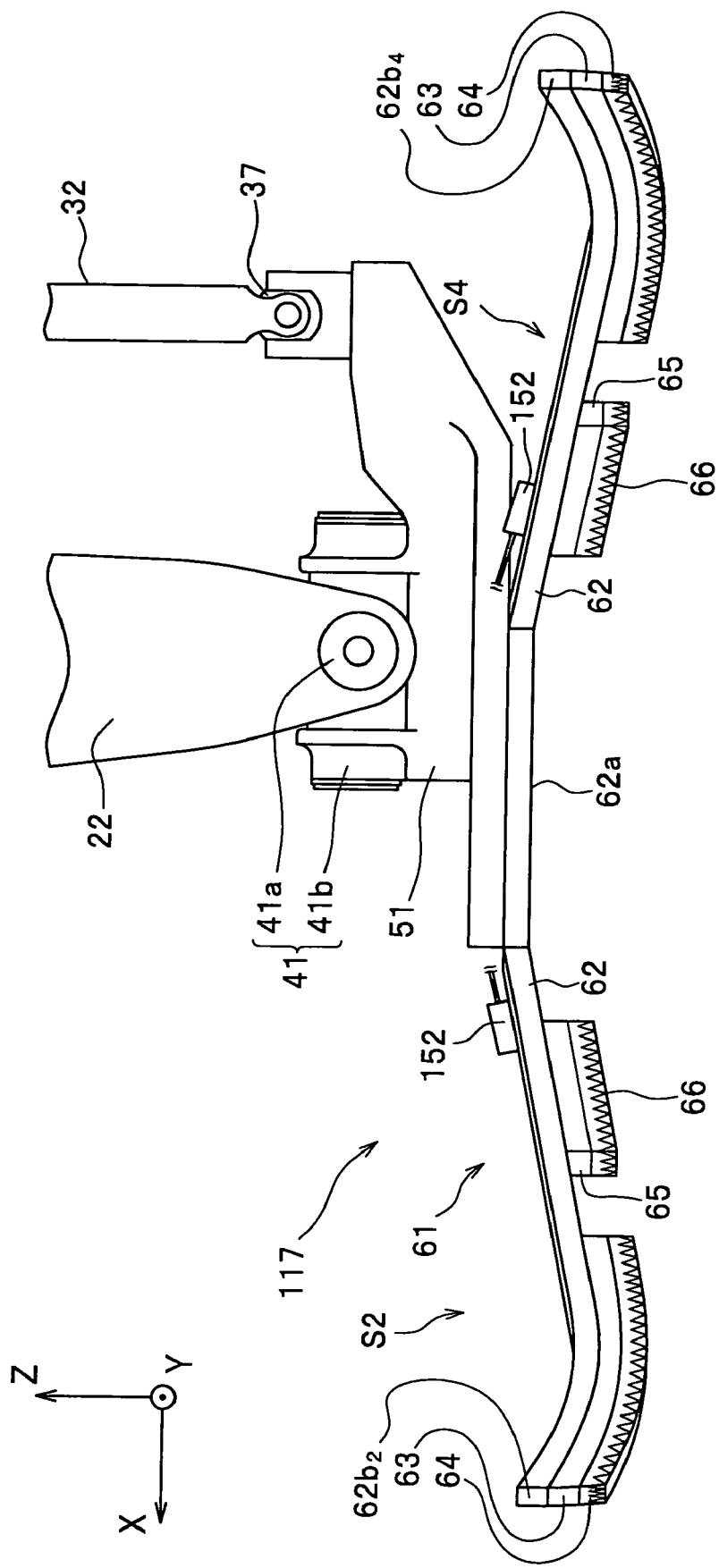
FIG. 10 is a side view for explaining the foot of the two-feet mobile robot according to the second embodiment.

FIG. 10 is a side view showing the foot of the two-feet mobile robot according to the second embodiment. As shown in FIG. 10, a foot 117 according to the second embodiment is provided with a distortion detecting means 152 instead of the force sensor 52. The first base seat part 51 and the plate spring means 61 are fixed by a plurality of bolts (not shown). The distortion detecting means 152 detects the distortion of the plate spring part, particularly the distortion of the spring part 62*b*. Since the distortion of the plate spring part correlates with the floor reaction force inputted into the plate spring part, the floor reaction force can be detected by detecting the amount of the distortion of the plate spring part.

The amount of the distortion detected is transmitted to the control unit 25 via the harness, and is used for controlling the posture and movement or the like of the robot R. As the distortion detecting means 152, one or more distortion gauges or piezo-electric elements attached to each spring part 62*b* are preferable.

The floor reaction force detected by the distortion detecting means 152 should be at least one axis (for example, the floor reaction force Fz of the Z-axial direction), and is preferably six axes in the same manner as the above force sensor 52.

The floor reaction force detector 52 can be omitted by providing the distortion detecting means 152, and the weight of the foot 17 can be further reduced. The shape of the floor surface can be detected by detecting the distortion of the plate spring parts S1 to S4.

Third Embodiment

Next, for the foot of the robot R according to the third embodiment of the present invention, different points between the first embodiment and the third embodiment are mainly described.

Figure 11:
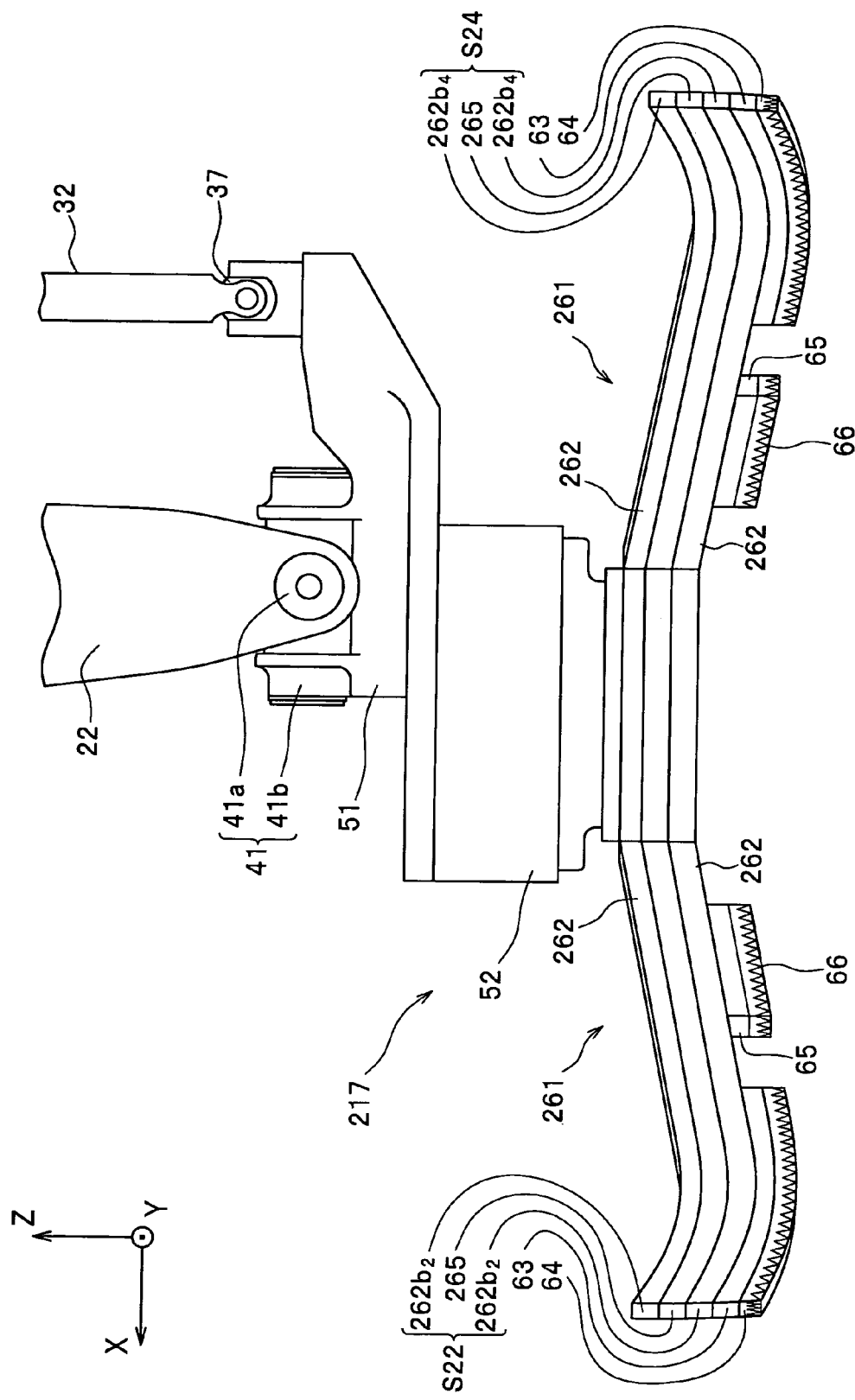
FIG. 11 is a side view for explaining a foot of a two-feet mobile robot according to the third embodiment.

FIG. 11 is a side view showing the foot of the two-feet mobile robot according to the third embodiment.

As shown in FIG. 11, a foot 217 according to the third embodiment is provided with a foot flat member 261 multi-layered instead of the foot flat member 61.

The foot flat member 261 is provided with a plurality of multilayered plate spring bodies 262 and 262, and a viscous member 265 interposed between the plate spring bodies 262 and 262. That is, the foot 217 is composed by a spring part 262b, the viscous member 265 and the spring part 262b sequentially from above. The foot 217 is provided with multilayered plate spring parts S21 to S24 (only S22 and S24 are shown), and can attenuate the vibration of the plate spring parts S21 to S24 at the time of being grounded by the viscous member 265 interposed. The multilayered spring parts 262b and 262b among the multilayered plate spring bodies 262 and 262 correspond to the "multilayered plate spring" in the claims.

The viscous member 265 should be made of a material having an attenuation function, and for example, a rubber or the like stuck on the adjoining plate spring body 262 is preferable. Since the viscous member 265 is also provided with the function of the intermediate member 63 described above in the construction, the intermediate member 63 can also be omitted.

Herein, although the whole foot flat member 261 is multilayered, at least the plate spring parts S21 to S24 should be multilayered.

Fourth Embodiment

Next, for the foot of the robot R according to the fourth embodiment of the present invention different points between the first embodiment and the fourth embodiment are mainly described.

Figure 12:
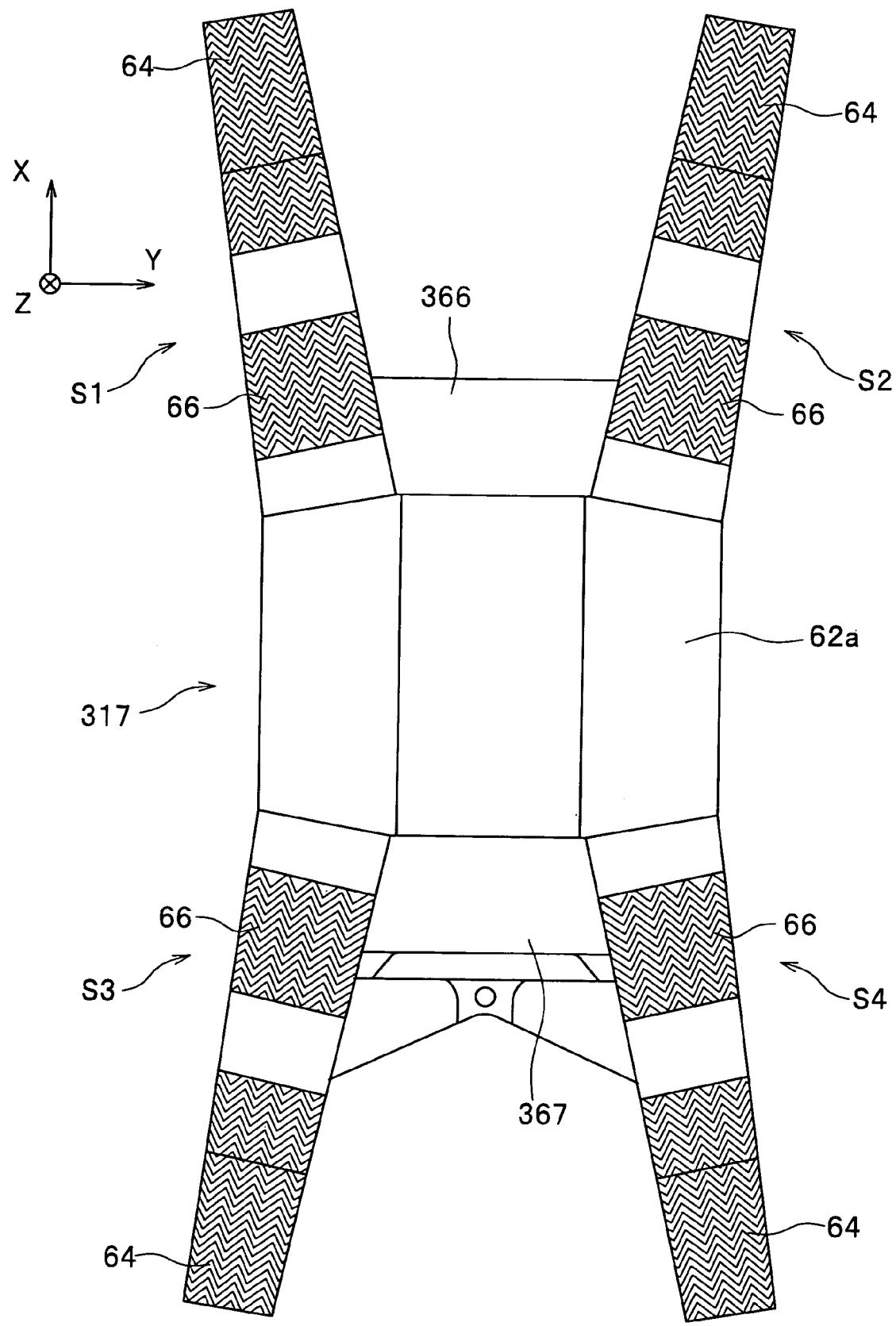
FIG. 12 is a bottom view for explaining a foot of a two-feet mobile robot according to the fourth embodiment.

FIG. 12 is a bottom view for explaining the foot of a two-feet mobile robot according to the fourth embodiment of the present invention. As shown in FIG. 12, a foot 317 according to the fourth embodiment is provided with connection parts 366 and 367 respectively bridged between the plate spring parts S1 and S2, and between the plate spring parts S3 and S4.

The connection part 366 is bridged between the plate spring parts S1 and S2, and connects the side of the base end parts of the plate spring parts S1 and S2 with the base part 62a thereof so as to function for synchronizing the actions of both the plate spring parts S1 and S2. The connection part 367 is bridged between the plate spring parts S3 and S4, and connects the side of the base end part of the plate spring parts S3 and S4 with the base part 62a thereof so as to function for synchronizing the actions of both the plate spring parts S3 and S4. The connection parts 366 and 367 are integrally formed with the base part 62a and the spring part 62b.

According to this construction, the rigidity of the roll direction or pitch direction of the plate spring part can be adjusted. When this connection part is not used, the roll rigidity is smaller than the pitch rigidity. That is, the connection part should be bridged between the arbitrary two plate spring parts for which the rigidity is desired to be secured. The connection part may be formed so as to separate from the base part 62a.

The connection part may have a structure in which it is not integrally formed, as long as it is structured so that two separate connection parts are bridged between the plate spring parts. As the connecting member, a bar or long tabular member having a predetermined rigidity is preferable. The connection between the connecting member and each plate spring part may be connected by fastenings, such as a pin.

<Modification of Plate Spring Part>

For the shape of the plate spring part of the present invention, various modifications can be considered. Hereinafter, the modifications of the plate spring part of the leg type mobile robot of the present invention are described. FIGS. 13 and 14 are bottom views showing the modifications of the plate spring part of the leg type mobile robot of the present invention.

Figure 13A:
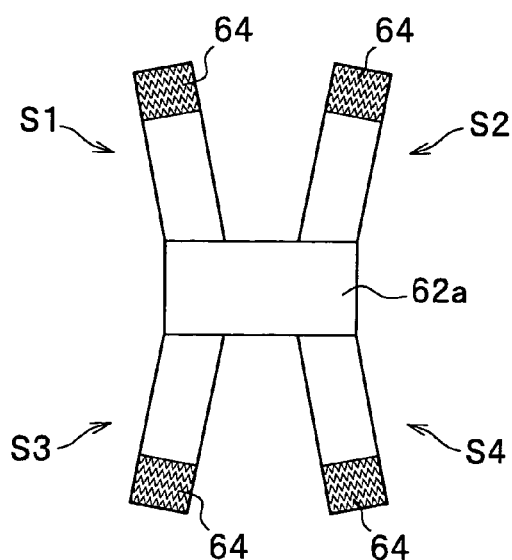
FIGS. 13A-13D are schematic views for explaining the modification of the plate spring part of the leg type mobile robot.

As described in the first to fourth embodiments, plate spring parts S1, S2, S3 and S4 shown in FIG. 13(a) are arranged and formed into a nearly letter H-shape. Since the plate spring parts S1 and S2 and the plate springs S3 and S4 are respectively provided so as to be opened from the X-axis, the construction can also oppose the falling force of the robot R in the Y-axial (right and left) direction. The opening angle can be suitably changed. The plate spring parts are respectively linearly symmetrical for the X-axis and the Y-axis, and it is preferable that the four plate spring parts S1, S2, S3 and S4 have the same spring coefficient, the same length and the same shape. Thus, the same spring characteristics can be exhibited in the forward and reverse movements.

Figure 13B:
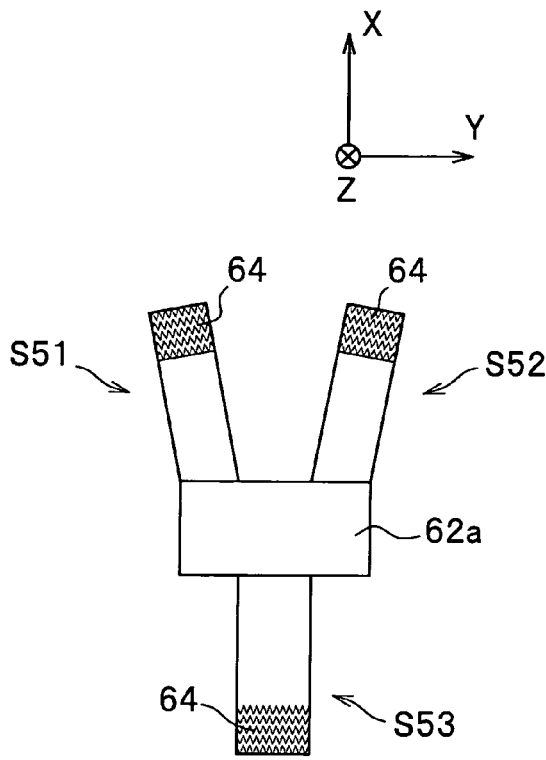

The plate spring parts S51, S52 and S53 shown in FIG. 13(b) are arranged into a letter Y-shape. Since two plate spring parts S51 and S52 are provided in advance, particularly, the plate spring parts S51 and S52 are suitable for advance movement.

Figure 13C:
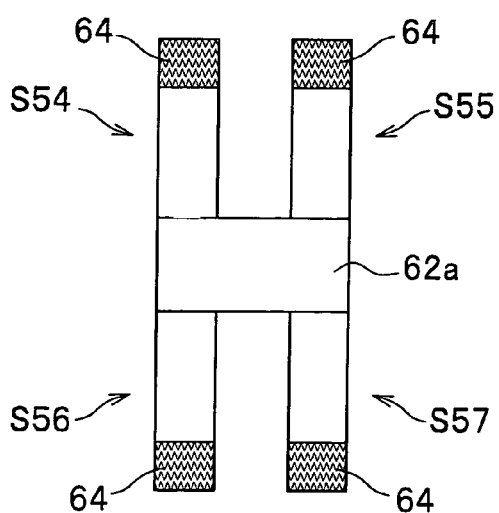

The plate spring parts S54, S55, S56 and S57 shown in FIG. 13(c) are arranged into a letter H-shape. That is, the group of the plate spring parts S54 and S56 and the group of the plate spring parts S55 and S56 are respectively arranged on the same straight line extending forward and backward, and the groups are parallel to each other. The plate spring parts are respectively linearly symmetrical for the X-axis and the Y-axis, and it is preferable that the four plate spring parts S54, S55, S56 and S57 have the same spring coefficient, the same length and the same shape. Thus, the same spring characteristics can be exhibited in the forward and reverse movements.

Figure 13D:
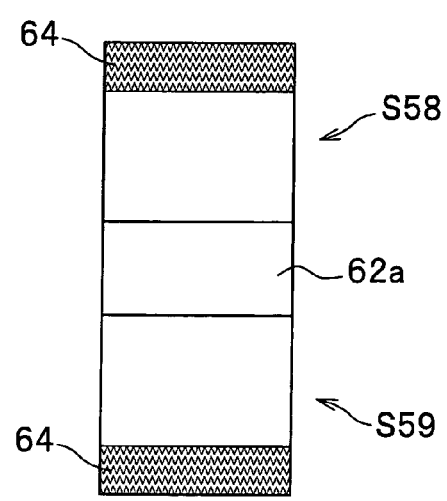

The plate spring parts S58 and S59 shown in FIG. 13(d) are arranged into a letter I-shape. The shape of the plate spring body is simple, and the plate spring body can be easily manufactured.

Figure 14A:
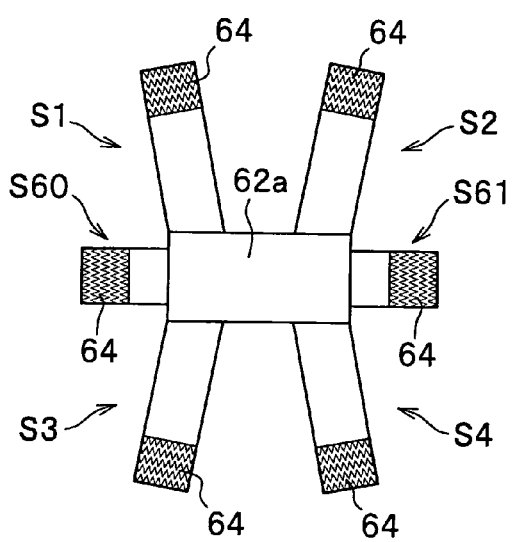
FIGS. 14A-14D are schematic views for explaining the modification of the plate spring part of the leg type mobile robot.

Referring to the plate spring parts S1, S2, S3, S4, S60 and S61 shown in FIG. 14(a), further, the plate spring parts S60 and S61 are respectively arranged in the right-and-left direction in addition to the plate spring parts S1, S2 and S3 and S4 shown in FIG. 13(a). The plate spring parts S60 and S61 provide a stronger construction against falling in the right-and-left direction. The plate spring part S60 or the plate spring part S61 may be provided only in the outer direction to the left and right legs R1 at the time of applying to the two-feet mobile robot.

Figure 14B:
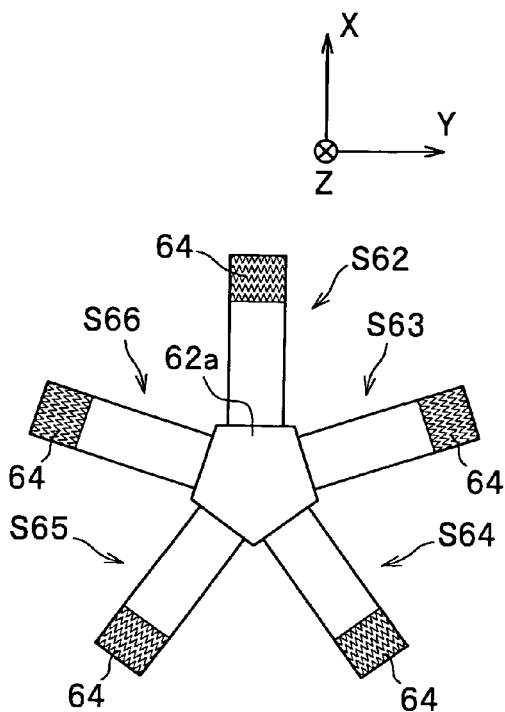

The plate spring parts S62, S63, S64, S65 and S66 shown in FIG. 14(b) are arranged so that the ground areas become the apexes of a regular pentagon. For example, when two plate spring parts are raised from the ground, and the four remaining plate spring parts are grounded, the load gravity point of the robot remains in the quadrangle composed by the ground areas of the four plate spring parts, and thereby the robot has a construction that makes it difficult to fall.

Figure 14C:
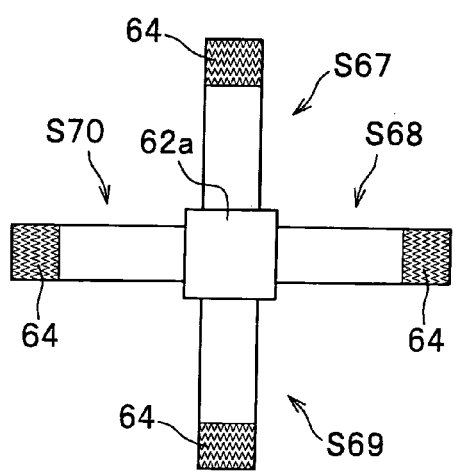

The plate spring parts S67, S68, S69 and S70 shown in FIG. 14(c) are arranged into a cross shape. The constructions shown in FIGS. 14(b) and (c) are suitable for a robot having 3 or more pairs of feet, and no directional specificity.

Figure 14D:
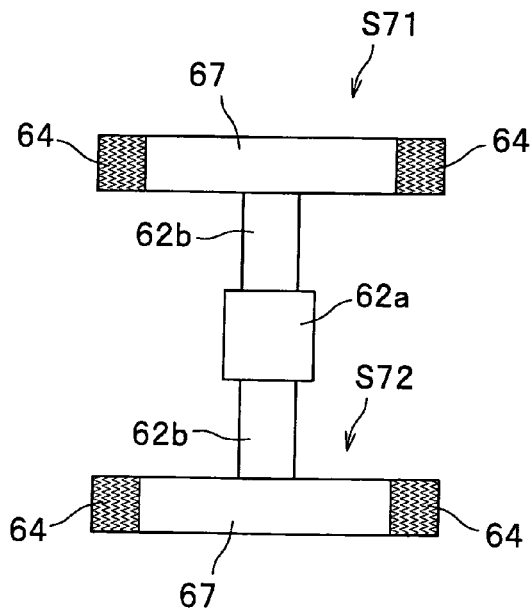

The plate spring parts S71 and S72 shown in FIG. 14(d) are arranged in front and behind the base part 62a. The plate spring part S71 (S72) is composed by the spring part 62b, and a plate material 67 extending in the right-and-left (Y-axis) direction is attached to the bottom surface of the tip part of the spring part 62b. The first sole members 64 are attached to both the left and right ends of the plate material 67. Thus, a plurality of ground areas can be formed on one plate spring part.

The plate spring parts having the shapes can be combined with the constructions of the above first to fourth embodiments, and may be the plate spring part having the other shape.

As described above, although the embodiments of the present invention were described, the present invention is not limited to the embodiments, and design variations can be suitably performed without departing from the spirit of the present invention. For example, the robot R is not limited to the two-feet mobile robot shown. The robot R may be the leg type mobile robot provided with only the one leg or the leg type mobile robot provided with the legs of 3 or more.

The moving system of the leg type mobile robot is not also limited to walking, and may be movements due to skipping, running and jumping or the like.

The ankle joint and the drive structure thereof are also not limited to the ones described above.

The materials of thigh link 21, the shank link 22, the first base seat part 51 and second base seat part 53 or the like can also be suitably changed. For example, the members may be made of alloy (titanium alloy and magnesium alloy or the like) having a predetermined intensity.

It is also possible to replace the first intermediate member 63 and the second intermediate member 65 with an intermediate member integrally formed, and it is possible to replace the first sole member 64 and the second sole member 66 with a sole member integrally formed.

Although the bottom surface side of the plate spring part is provided with various intermediate members and sole members, it is also possible to omit the intermediate member and the sole member at the time of using on the floor surface in which the influence of the vibration and slip of the plate spring part is small.

The shapes of the first base seat part 51 and second base seat part 53 can also be suitably changed, and first base seat part 51 and second base seat part 53 can be integrally formed with the case of the force sensor 52. The shape of the base part to which the plate spring part is attached can also be changed, and the plate spring part may be directly attached to the second base seat part 53 and the case of the force sensor 52. In this case, the second base seat part 53 and the force sensor 52 become the base part.

Also, the number and shape of the plate spring parts can be suitably changed, and one plate spring part can be composed by combining a plurality of plate springs.

A plate spring part transforming regulation part for preventing the plate spring part from transforming more than a predetermined amount may be provided above the plate spring part. Examples of the plate spring part transforming regulation means include a structure provided with a flange part provided so as to be isolated above the plate spring part and a projection provided on the bottom surface of the flange part, the plate spring part abuts against the projection when the plate spring part transforms more than a predetermined amount, and thereby further transformation is regulated. Thus, even when excessive floor reaction force is inputted into a certain plate spring part, the amount of transformation of the plate spring part can be regulated, and the breakage of the plate spring part can be prevented.

The design of the offset direction and distance to the position Pa of the center Pc of the ankle joint can also be suitably changed, and the center Pc of the ankle joint may be located on the position Pa.

The invention claimed is:

1. A leg type mobile robot comprising:
    an body;
    legs, each leg connected to the body via a first joint; and
    feet, each foot connected to an end part of the leg via a second joint,
    one foot of the feet including a first base seat part and a foot portion having a lower end part having ground areas grounded on a floor surface,
    the foot portion including
        a base part having a shape along a bottom surface of a second base seat part provided between the second joint and the foot portion, wherein a sensor is disposed between the first and the second base seat parts, and
        a plurality of plate spring parts extending downward from the base part, having the ground areas formed at the front and back sides of the base part and the second base seat part and supporting empty weight of the leg type mobile robot while bending at the time of being grounded.

2. The leg type mobile robot according to claim 1, wherein the foot portion includes a plurality of ground areas.

3. The leg type mobile robot according to claim 2, wherein the plurality of ground areas are separately arranged backward and forward to the second joint.

4. The leg type mobile robot according to claim 3, wherein at least one of the ground areas is curved upward as the ground area separates from the second joint.

5. The leg type mobile robot according to claim 1, wherein the foot portion includes a first sole member generating frictional resistance between the floor surface and the first sole member at the time of being grounded as the ground area.

6. The leg type mobile robot according to claim 5, further comprising a first intermediate member for attenuating the vibration of the plate spring part when the first sole member is grounded between the plate spring part and the first sole member.

7. The leg type mobile robot according to claim 6, wherein the first intermediate member allows a displacement in the direction of the floor surface to the plate spring part of the first sole member when the first sole member is grounded.

8. The leg type mobile robot according to claim 5, wherein the foot portion includes a second sole member generating frictional resistance between the floor surface and the second sole member at the time of being grounded above the first sole member.

9. The leg type mobile robot according to claim 8, further comprising a second intermediate member for attenuating the vibration of the plate spring part when the second sole member is grounded between the plate spring part and the second sole member.

10. The leg type mobile robot according to claim 9, wherein the second intermediate member allows a displacement in the direction of the floor surface to the plate spring part of the second sole member when the second sole member is grounded.

11. The leg type mobile robot according to claim 1, wherein four plate spring parts are provided,
    wherein two plate spring parts extend forward from the base part,
    wherein two remaining plate spring parts extend backward from the base part, and
    wherein the four plate spring parts and the base part are formed into a nearly letter H-shape.

12. The leg type mobile robot according to claim 1, wherein the plate spring part is made of a composite member reinforced with fiber.

13. The leg type mobile robot according to claim 1, wherein the plate spring part includes a plurality of layers having a different modulus of elasticity.

14. The leg type mobile robot according to claim 1, wherein the plate spring part includes multilayered plate springs and a viscous member interposed between the plate springs.

15. The leg type mobile robot according to claim 1, further comprising an attenuation means for attenuating the vibration of the plate spring part.

16. The leg type mobile robot according to claim 1, wherein a plurality of plate spring parts are provided, and a connection part for connecting the two plate spring parts is provided.

17. The leg type mobile robot according to claim 1, wherein the foot includes a floor reaction force detecting means for detecting a floor reaction force acting from the floor surface via the foot portion.

18. The leg type mobile robot according to claim 17, wherein the floor reaction force detecting means is a unitized floor reaction force detector.

19. The leg type mobile robot according to claim 18, wherein the foot portion is fixed to the floor reaction force detector.

20. The leg type mobile robot according to claim 18, wherein the foot portion includes the plurality of ground areas, wherein the center of the second joint is offset to a position where a distance to the remotest point of the plurality of ground areas is minimum in a plane view, and wherein the center of the floor reaction force detector is provided so as to be closer to a position where a distance to the remotest point of the plurality of ground areas is minimum in a plane view than the center of the second joint.

21. The leg type mobile robot according to claim 18, wherein the foot portion includes the plurality of ground areas; and the floor reaction force detector is provided at a position where a distance to the remotest point of the plurality of ground areas is minimum in a plane view.

22. The leg type mobile robot according to claim 17, wherein the floor reaction force detecting means is a distortion detecting means for detecting the distortion of the plate spring part.

23. The leg type mobile robot according to claim 8, further comprising an attenuation means for attenuating the vibration of the plate spring part.

24. The leg type mobile robot according to claim 8, wherein the foot includes a floor reaction force detecting means for detecting a floor reaction force acting from the floor surface via the foot portion.

* * * * *